United States Patent
Shingai et al.

(10) Patent No.: US 8,194,020 B2
(45) Date of Patent: Jun. 5, 2012

(54) LIQUID CRYSTAL DISPLAY DEVICE

(75) Inventors: Tomohisa Shingai, Kawasaki (JP); Masaki Nose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 12/628,560

(22) Filed: Dec. 1, 2009

(65) Prior Publication Data

US 2010/0073343 A1 Mar. 25, 2010

Related U.S. Application Data

(63) Continuation of application No. PCT/JP2007/000764, filed on Jul. 13, 2007.

(51) Int. Cl.
*G09G 3/36* (2006.01)
*G09G 5/10* (2006.01)

(52) U.S. Cl. .......................................... 345/89; 345/690

(58) Field of Classification Search ........................ None
See application file for complete search history.

(56) References Cited

U.S. PATENT DOCUMENTS

| | | | |
|---|---|---|---|
| 6,667,732 B1 | 12/2003 | Katase | |
| 7,049,756 B2 * | 5/2006 | Aiba et al. | 315/172 |
| 2003/0122761 A1 * | 7/2003 | Hong | 345/89 |
| 2007/0200874 A1 * | 8/2007 | Amundson et al. | 345/690 |
| 2008/0024412 A1 | 1/2008 | Nose | |

FOREIGN PATENT DOCUMENTS

| | | |
|---|---|---|
| JP | 03-120515 A | 5/1991 |
| JP | 05-188352 A | 7/1993 |
| JP | 2000-231088 A | 8/2000 |
| JP | 2002-032131 A | 1/2002 |
| JP | 2005-227627 A | 8/2005 |
| JP | 2005-345661 A | 12/2005 |
| WO | 2000/058777 A1 | 10/2000 |
| WO | 2006/103738 A1 | 10/2006 |

OTHER PUBLICATIONS

"MC33171, MC33172, MC33174 Single Supply 3.0 V to 44 V, Low Power Operational Amplifiers", Semiconductor Components Industries, LLC, 2004.
International Search Report of PCT/JP2007/000764, mailing date of Aug. 14, 2007.

* cited by examiner

*Primary Examiner* — Andrew L Sniezek
(74) *Attorney, Agent, or Firm* — Fujitsu Patent Center

(57) ABSTRACT

A LCD device, in which a multi-grayscale level state is produced in a liquid crystal layer by applying a different voltage thereto, includes a liquid crystal display panel having the liquid crystal layer between first and second electrodes, an electrode drive circuit applying drive voltage pulses generated from multi-voltage power sources to the first and the second electrodes, and a multi-voltage power generator circuit. The LCD device further includes a multi-voltage power switch circuit supplying the first or the second multi-voltage power sources from the first or the second multi-voltage power units to the electrode drive circuit, and a control circuit, in a first drive step, setting the first multi-voltage power unit to an active state, and, in a second drive step, setting the second multi-voltage power unit to the active state.

7 Claims, 17 Drawing Sheets

LIQUID CRYSTAL DISPLAY DEVICE

CROSS-REFERENCE TO RELATED APPLICATION

This application is a continuation of International Application No. PCT/JP2007/000764, filed on Jul. 13, 2007, now pending, herein incorporated by reference.

FIELD

The present invention relates to a liquid crystal display device, and more particularly to a liquid crystal display device having a power generator circuit operated with reduced power.

BACKGROUND

The application of electronic paper is proposed to various portable devices, such as electronic books, sub-displays for mobile terminal devices and display devices for IC cards. As one of major display devices of electronic paper, there is a display device using a liquid crystal composition in which a cholesteric phase is formed (referred to as cholesteric liquid crystal or chiral nematic liquid crystal, and in the present specification, the term of cholesteric liquid crystal is used integrally). The cholesteric liquid crystal has excellent features such as semi-permanent retention characteristic of display (memorability), characteristic of vivid color display, high contrast characteristic and high resolution characteristic.

FIG. 1 is a diagram illustrating a cross-sectional configuration of the liquid crystal display device using the cholesteric liquid crystal, by which a full color display can be made. A liquid crystal display device 1 has a laminated structure of blue color display section 10, green color display section 11 and red color display section 12, in order from the display surface on the user 3 side. In the above figure, the upper substrate side is the display surface, and it is configured that an external light 2 is incident from the upper side of the substrate toward the display surface.

The blue color display section 10 includes a liquid crystal 10LC for blue color, which is sealed in between a pair of upper and lower substrates 10A, 10B, and a drive circuit 10P for applying a predetermined pulse voltage to the liquid crystal layer 10LC for blue color. The green color display section 11 includes a liquid crystal 11LC for green color, which is sealed in between a pair of upper and lower substrates 11A, 11B, and a drive circuit 11P for applying a predetermined pulse voltage to the liquid crystal layer 11LC for green color. Further, the red color display section 12 includes a liquid crystal 12LC for red color, which is sealed in between a pair of upper and lower substrates 12A, 12B, and a drive circuit 12P for applying a predetermined pulse voltage to the liquid crystal layer 12LC for red color. Moreover, on the back face of the lower substrate 12B of the red color display section 12, a light absorption layer 13 is disposed.

The cholesteric liquid crystal used in each of the liquid crystal layers 10LC, 11LC and 12LC for blue, green and red colors is the mixture of a liquid crystal having a relatively large amount of chiralic additive agent (which is also referred to as chiral material) being added to a nematic liquid crystal, with a content rate of several tens wt %. When the relatively large amount of chiral material is contained in the nematic liquid crystal, it is possible to form a cholesteric phase in which nematic liquid crystal molecules are intensively twisted into a spiral shape. For the above reason, the cholesteric liquid crystal is also referred to as chiral nematic liquid crystal.

The cholesteric liquid crystal provides a bistable property (memory characteristic), and can take either one of the states of a planar state (reflection state), a focal conic state (transmission state) and an intermediate state by the mixture thereof, by the control of an electric field intensity applied to the liquid crystal. Further, once the cholesteric liquid crystal takes the planar state, the focal conic state or the intermediate state thereof, the above state is stably retained even the electronic field is removed thereafter.

For example, the planar state is obtained by applying a strong electronic field to a liquid crystal layer by the application of a predetermined high voltage between the upper and the lower substrates, so that the liquid crystal is made to be a homeotropic state, and thereafter, the electric field is abruptly removed to zero. Also, the focal conic state is obtained, for example, by applying an electric field to the liquid crystal layer by the application of a predetermined voltage, which is lower than the above high voltage, between the upper and the lower substrates, and thereafter, the electric field is abruptly removed to zero. Or otherwise, the focal conic state may also be obtained by gradually applying a voltage from the planar state. Further, the intermediate state between the planar state and the focal conic state is obtained, for example, by applying an electronic field to the liquid crystal layer by applying a voltage, which is lower than the voltage to obtain the focal conic state, between the upper and the lower substrates, and thereafter, the electric field is abruptly removed to zero.

FIGS. 2A and 2B are diagrams illustrating the display principle of the liquid crystal display device by use of the cholesteric liquid crystal. In FIG. 2, the blue color display section is explained as an example. FIG. 2A depicts the orientation states of the liquid crystal molecules LC of the cholesteric liquid crystal, when the liquid crystal layer 10LC for blue color in the blue color display section 10 is in the planer state. As depicted in FIG. 2A, the liquid crystal molecules LC in the planar state form a spiral structure by the successive rotation thereof in the substrate thickness direction. The spiral axis of the spiral structure is substantially perpendicular to the substrate plane.

In the planar state, a light having a predetermined wavelength corresponding to the spiral pitch of the liquid crystal molecules is selectively reflected on the liquid crystal layer. Let n to be an average refractive index of the liquid crystal layer, and also let p to be a spiral pitch, then a wavelength λ producing a maximum reflection is expressed by λ=n·p. Accordingly, if the average refractive index n and the spiral pitch p are determined so as to obtain λ=480 nm, the liquid crystal layer 10LC for blue color in the blue color display section 10 selectively reflects a blue light when being in the planar state. The average refractive index n can be adjusted by the selection of the liquid crystal material and the chiral material, and the spiral pitch p can be controlled by the adjustment of the content rate of the chiral material.

FIG. 2B depicts the states of orientation of liquid crystal molecules in the cholesteric liquid crystal, when the liquid crystal layer LC for blue color in the blue color display section 10 is in the focal conic state. As depicted in FIG. 2B, the liquid crystal molecules in the focal conic state form a spiral structure by the successive rotation thereof in the direction of the substrate plane, and thus, the spiral axis of the spiral structure becomes substantially parallel to the substrate plane. In the focal conic state, the selectivity of the reflective wavelengths is lost in the liquid crystal layer 10LC for blue color, and most of the incident light 2 is transmitted through.

Then, the transmitted light is absorbed in the light absorption layer 13 being disposed on the back plane of the lower substrate 12B in the red color display section 12, and accordingly, a dark color (black) display is produced.

In the intermediate state between the planar state and the focal conic state, it is possible to vary the intensity of the reflected light because a ratio between the reflected light and the transmitted light can be adjusted according to the state thereof. As such, in the cholesteric liquid crystal, the amount of the reflected light can be controlled by the state of orientation of the liquid crystal molecules being twisted in a spiral shape.

If a cholesteric liquid crystal, which selectively reflects green or red light in the planar state, is sealed into each of the liquid crystal layer for green color and the liquid crystal layer for red color, like the liquid crystal layer for blue color, a liquid crystal display device of full color display can be realized.

Thus, by using the cholesteric liquid crystals, and by laminating the liquid crystal display panels each selectively reflecting red, green or blue light, a full-color display device having memory characteristics can be obtained. The above color display can be made with power consumption=0, except for the time of rewriting the screen.

FIG. 3 is a diagram illustrating a reflectivity characteristic versus a drive voltage in a cholesteric liquid crystal. When a strong electric field (by a high voltage V1) is given to the liquid crystal, there is produced a homeotropic state HT, in which the spiral structure of the liquid crystal molecules is entirely released, and the entire molecules are subject to the direction of the electric field. If the electric field is abruptly removed to zero from the homeotropic state HT, the spiral axis of the liquid crystal becomes perpendicular, and a planar state PL is produced accordingly. Then, if the electric field is removed after a weak electric field (by a voltage V2) in the order insufficient to release the spiral structure of the liquid crystal molecules is applied from the planner state PL, a focal conic state FC is produced. Further, if an abrupt electric field removal is made after the supply of intermediate electric fields (by voltages V3, V4), there is produced a gray state, in which the planar state and the focal conic state are existent in a mixed manner.

In case that the liquid crystal is driven by a pulse voltage, when the initial state is the planar state PL, the focal conic state FC can be produced by letting the pulse voltage to be the voltage V2, or of that order, and the planar state PL can be produced by further letting the pulse voltage to be the higher voltage V1. Also, when the initial state is the focal conic state FC, the focal conic state FC can be maintained by letting the pulse voltage to be the voltage V2, or of that order, and the planar state PL can be produced by further letting the pulse voltage to be the higher voltage V1. Further, by applying the voltages V4, V3 of gray ranges A, B from the planar state PL, it is possible to produce gray states in which the planer state and the focal conic state are existent in a mixed manner.

In the liquid crystal display device depicted in FIG. 1, by writing an image having the planar state (reflection state, RGB) and the focal conic state (transmission state, black) into each RGB display panel 10, 11, 12, it is possible to obtain a multi-color display having eight colors. In the above case, it is sufficient to write a monochrome image with the voltage V1 or V2 depicted in FIG. 3 applied to each display panel, and accordingly, very small energy is required for writing, and a required accuracy for the power voltage is low.

On the other hand, when performing full color display exceeding eight colors, it is necessary to write a multi-grayscale image into each display panel. In the patent document WO 06/103738 (Oct. 5, 2006), there is described a drive method for writing a multi-grayscale image in a cholesteric liquid crystal display panel.

According to the above display method for full color display, in a step 1, either a high voltage or a low voltage is applied to the liquid crystal of each pixel, so as to produce a planar state or a focal conic state. Further, in a step 2, a relatively high or low voltage is applied to a pixel in the planar state, so that a gray state is produced. By the execution of the drive process in the step 2 for a plurality of times, it is possible to produce gray states having multi-grayscale levels. According to the above write drive method, the gray states are realized with high accuracy, and it is possible to provide electronic paper for displaying a color image of high quality.

SUMMARY

Accordingly, it is an object of the present invention to provide a liquid crystal display device, in which the power consumption of a power generator circuit necessary for write drive is suppressed.

A liquid crystal display device, in which a multi-grayscale level state is produced in a liquid crystal layer by applying a different voltage thereto, includes: a liquid crystal display panel having the liquid crystal layer between first and second electrodes; an electrode drive circuit, being supplied multi-voltage power sources, and applying drive voltage pulses generated from the multi-voltage power sources to the first and the second electrodes; and a multi-voltage power generator circuit supplying the multi-voltage power sources to the electrode drive circuit, wherein the multi-voltage power generator circuit includes a first multi-voltage power unit generating first multi-voltage power sources with first stability and having a first consumption current, and a second multi-voltage power unit generating second multi-voltage power sources with second stability higher than the first stability, and having a second consumption current higher than the first consumption current. The liquid crystal display device further includes: a multi-voltage power switch circuit supplying the first or the second multi-voltage power sources from the first or the second multi-voltage power units to the electrode drive circuit; and a control circuit, in a first drive step, setting the first multi-voltage power unit to an active state and switching the multi-voltage power switch circuit to a supplying state of the first multi-voltage power sources, and, in a second drive step, setting the second multi-voltage power unit to the active state and switching the multi-voltage power switch circuit to a supplying state of the second multi-voltage power sources.

According to the present invention, it is possible to suppress the power consumption of the power generator circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The drive process in the above-mentioned step 1 is identical to the writing of multi-color display of eight colors. Because energy required for writing is low and the accuracy for a power voltage is low, a power generator circuit can be realized relatively easily with low consumption power, although there are difficulties such that a source capability (capability to inject current into the load) and a sink capability (capability to absorb current from the load) are required depending on timing. On the other hand, in the drive process of the step 2, the accuracy required for the power voltage is high, and the source capability and the sink capability are required depending on timing. In order to generate the power voltage with high accuracy, for example, a voltage regulator having a voltage gain of 1, in which total feedback is performed in an operational amplifier, is widely used for a power generator circuit. The above operational amplifier for the voltage regulator is a voltage follower circuit having high voltage accuracy, also being provided with both source capability and sink capability.

However, in the above-mentioned voltage follower circuit, power consumption is very large as compared with a drive capability. In general, the voltage follower circuit includes an emitter follower transistor or a source follower transistor in the output stage thereof, and requires a large output current to avoid resonance with a load capacity. Therefore, a large current continuously flows in the voltage follower circuit, and accordingly, power consumption becomes very large.

Although the liquid crystal display device using the cholesteric liquid crystal does not consume power in the steady state, write drive is performed at the time of rewriting a display image, using a voltage generated by the above-mentioned power generator circuit. It is not preferable that large current consumption is produced at the time of the above write drive.

Moreover, the power generator circuit consumes a relatively large current at the time of switching the power on. Therefore, when a write frequency is relatively large, it is desirable that the power generator circuit is maintained in an active state. However, if the voltage follower circuit is continuously maintained in the active state, the power consumption becomes large, which is not preferable.

Preferred embodiments of the present invention will be explained with reference to accompanying drawings.

Figure 1:
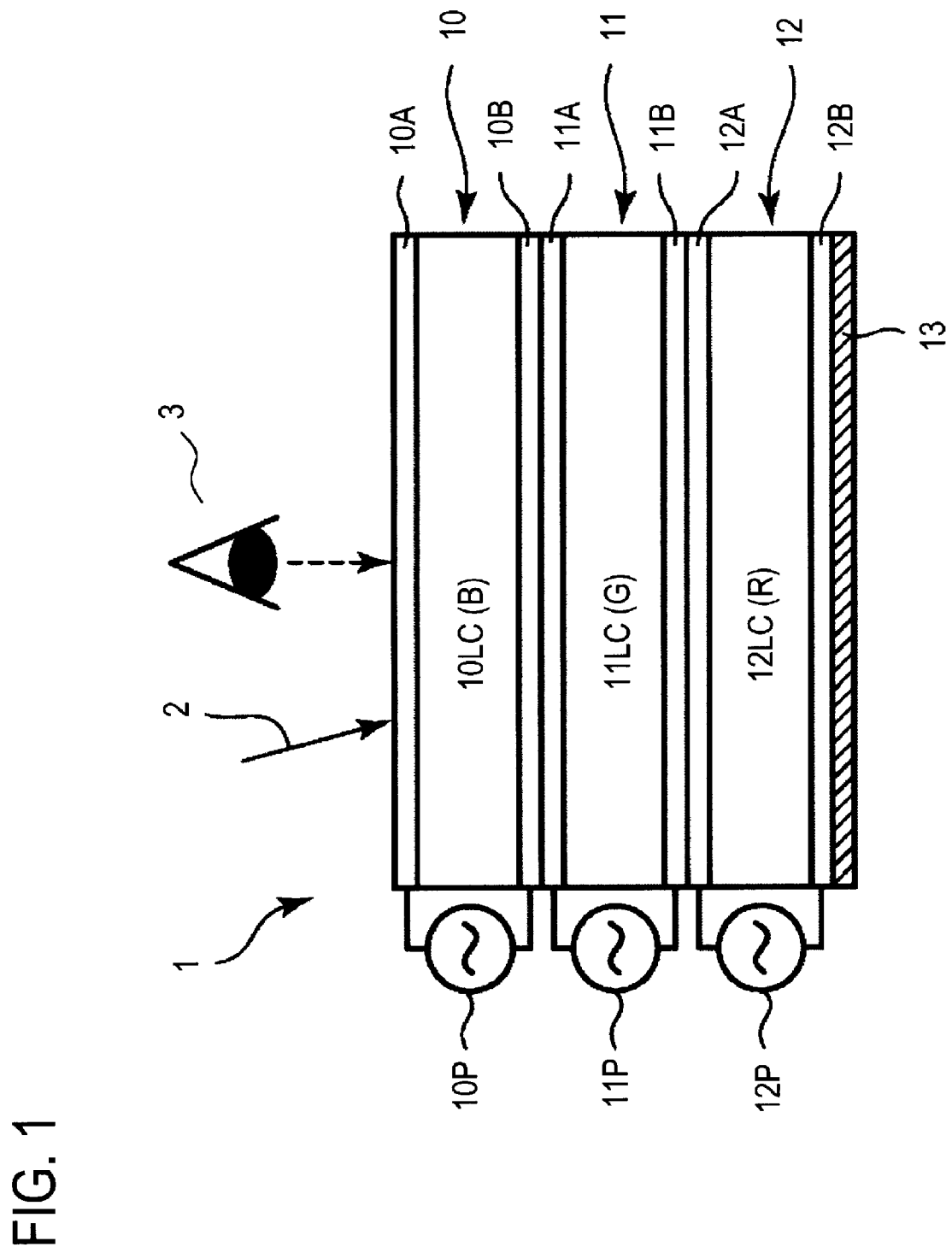
FIG. 1 is a diagram illustrating a cross-sectional configuration of the liquid crystal display device using the cholesteric liquid crystal, by which a full color display can be made.
Figure 4:
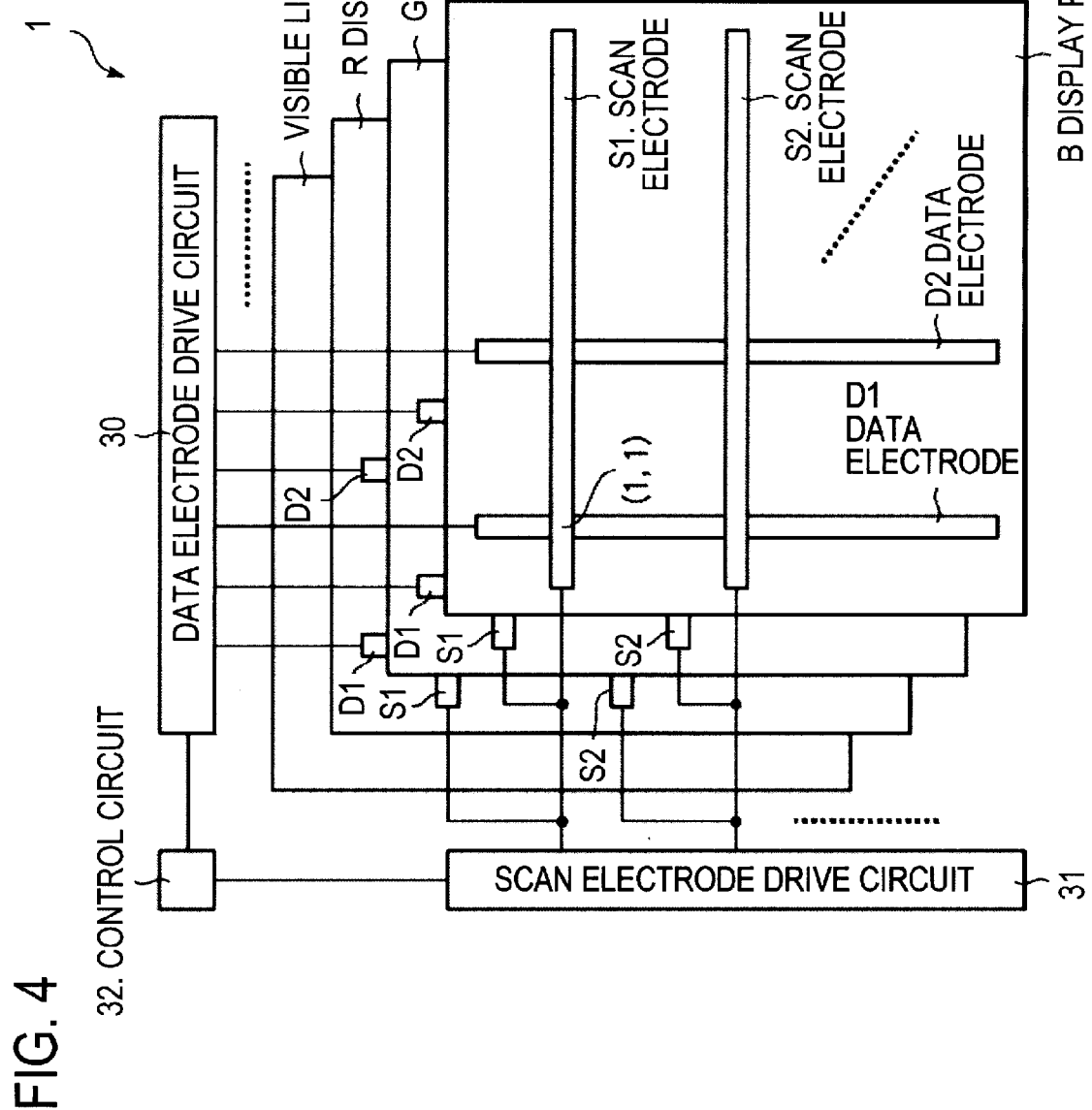
FIG. 4 is a schematic configuration diagram of a liquid crystal display panel device according to a present embodiment.

FIG. 4 is a schematic configuration diagram of a liquid crystal display panel device according to a present embodiment. As depicted in FIG. 1, a color liquid crystal display panel includes BGR display panels 10, 11, 12 and a visible light absorption layer 13. Each display panel 10, 11, 12 includes a plurality of scan electrodes S1, S2 extending to the horizontal direction, and a plurality of data electrodes D1, D2 extending to the vertical direction. A position at which the above electrodes intersect configures a pixel (1, 1). A scan electrode drive circuit 31 commonly provided to the three panels applies a scan pulse to each scan electrode S1, S2 of the panels. On the other hand, a data electrode drive circuit 30, which is individually provided on each panel, applies a data pulse corresponding to a write data to each data electrode D1, D2. Further, a drive control circuit 32 controls the drive of both the data electrode drive circuit 30 and the scan electrode drive circuit 31.

In the rewrite drive of the color liquid crystal display panel, the scan electrode drive circuit 31 simultaneously applies scan pulses to the scan electrodes of the three panels, so as to successively select the scan electrodes. On the other hand, the data electrode drive circuit 30 applies data pulses corresponding to the respective write data, to the data electrodes of the three panels. By this, the liquid crystal layers of the three panels respectively become a state corresponding to the write data.

The scan electrode drive circuit 31 is also referred to as a common driver, because of the supply of a common signal to select a particular write line, irrespective of data to be displayed. Further, the data electrode drive circuit 30 is also referred to as a segment driver, because of corresponding to a segment electrode drive circuit in a display panel of segment type. A general-purpose liquid crystal panel drive circuit is compatible for any of the common driver and the segment driver, and works as either driver, in response to a mode signal (not depicted) from the drive control circuit 32.

Figure 5:
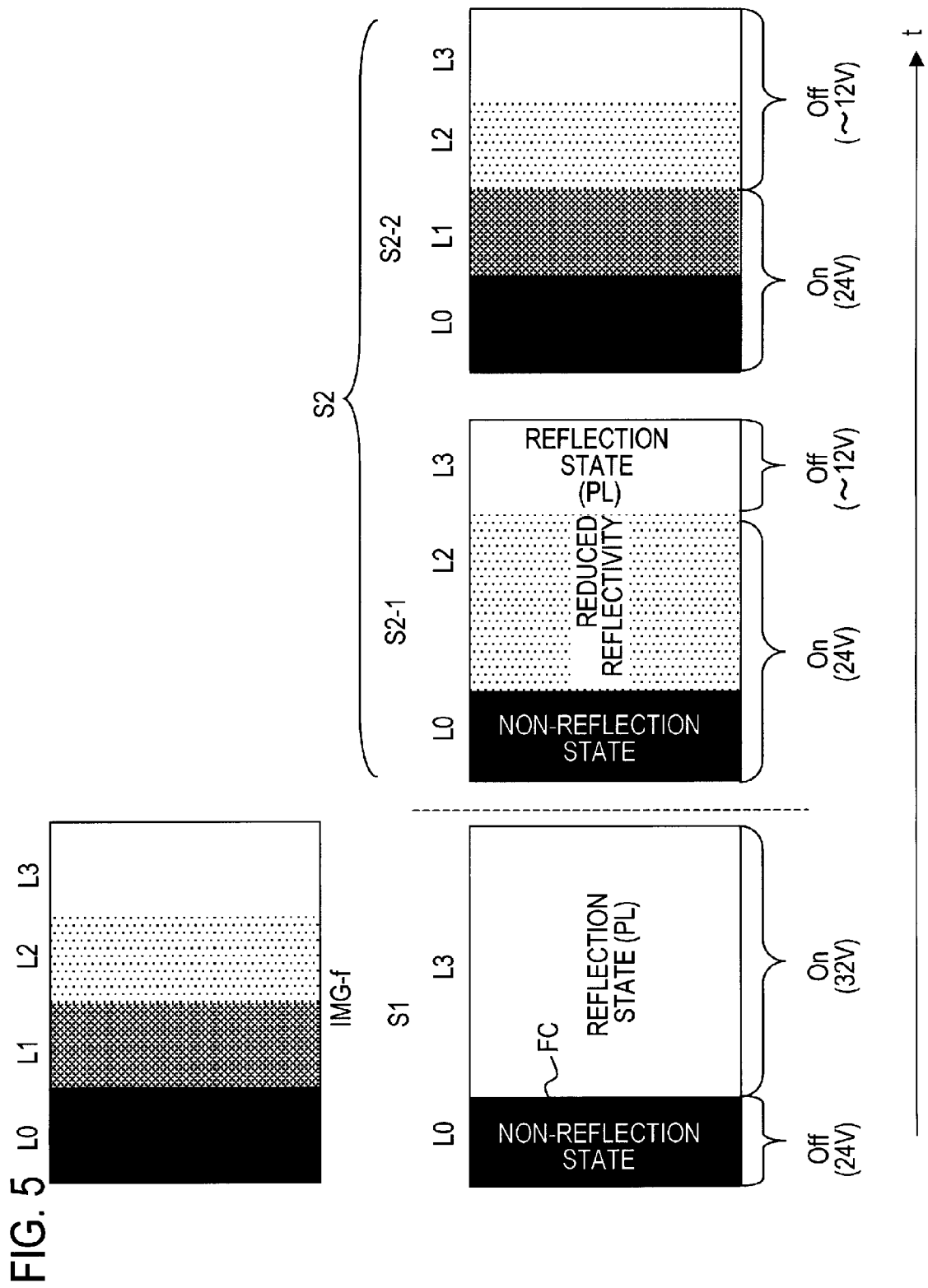
FIG. 5 and FIG. 6 are diagrams illustrating a multi-grayscale level drive method.
Figure 6:
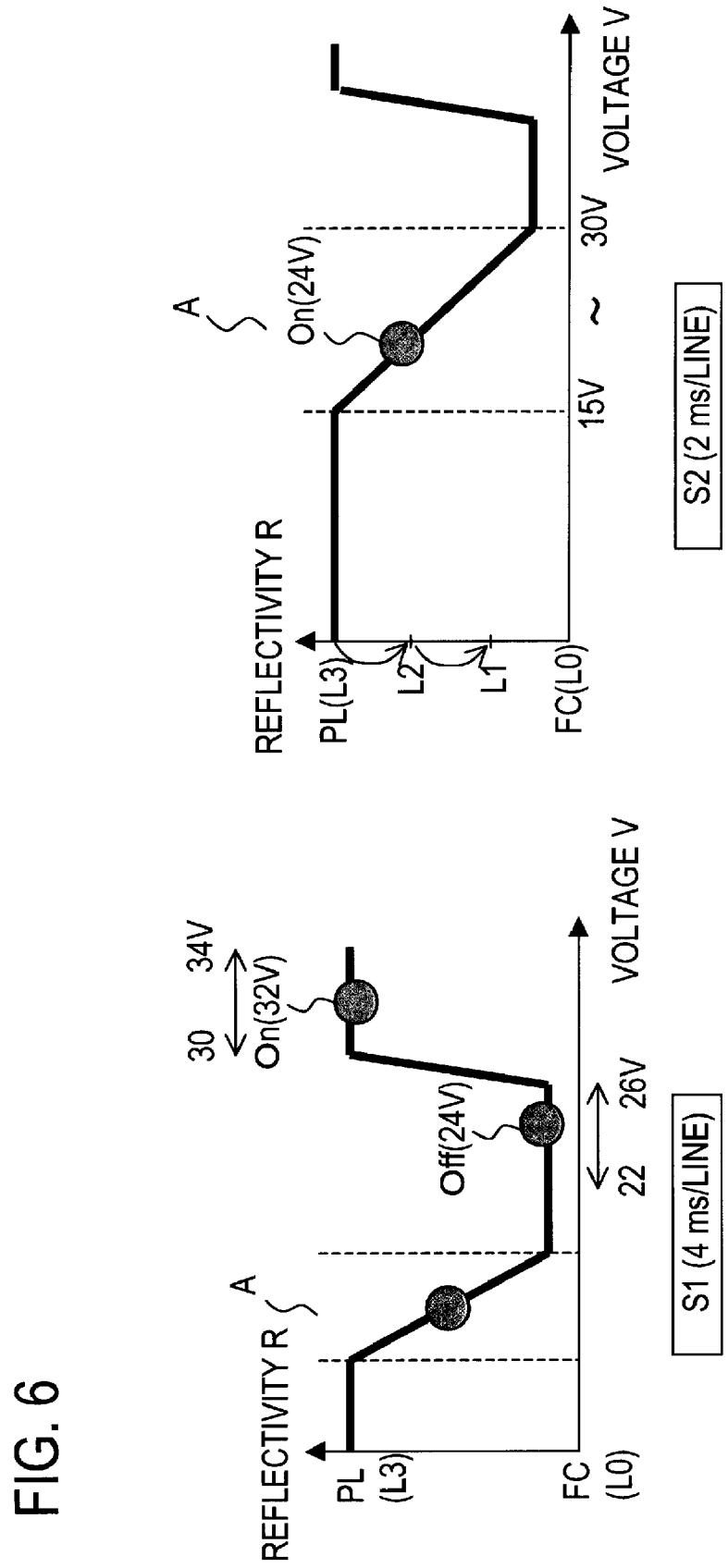
Figure 7:
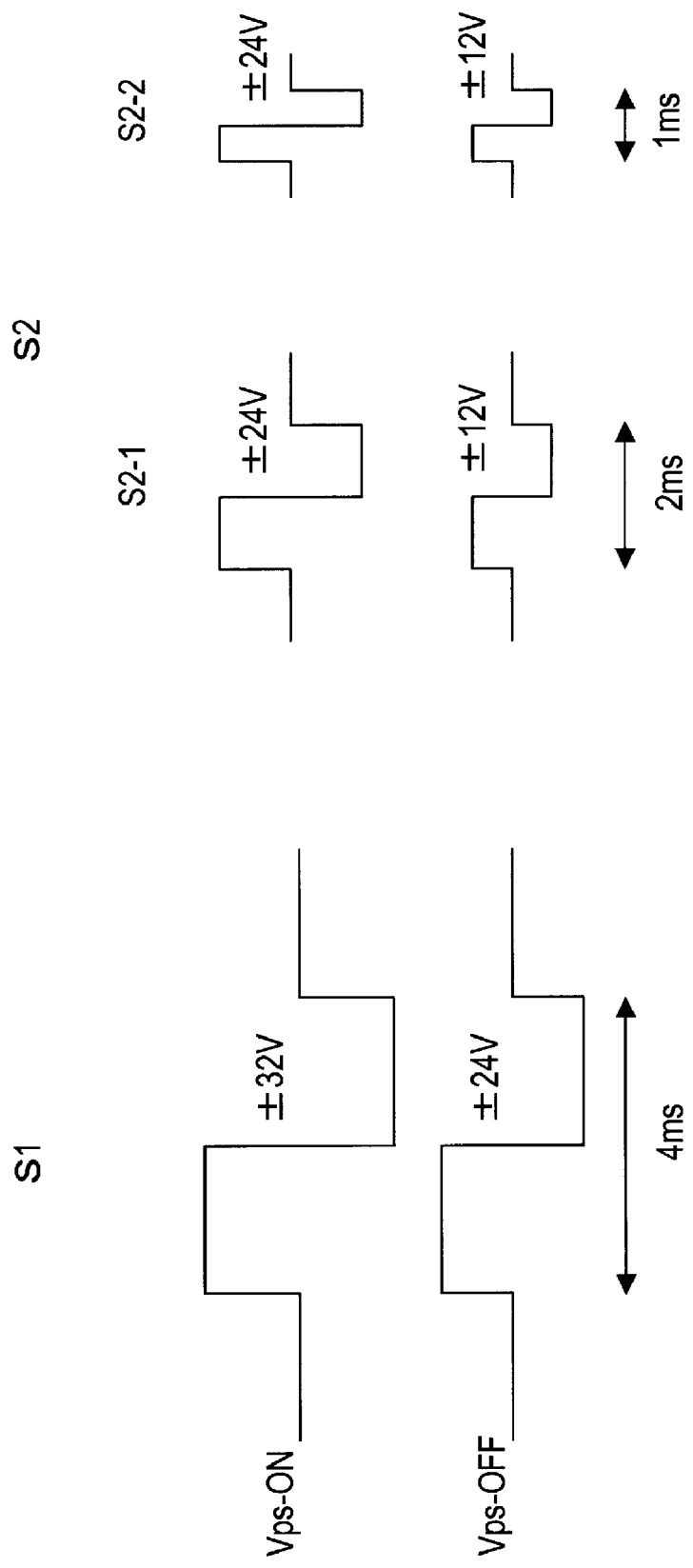
FIG. 7 is a diagram illustrating alternating-current pulses (hereafter, alternating-current pixel pulses) which are applied to the liquid crystal at pixels in the multi-grayscale level drive method.

FIG. 5 and FIG. 6 are diagrams illustrating a multi-grayscale level drive method. Also, FIG. 7 is a diagram illustrating alternating-current pulses (hereafter, alternating-current pixel pulses) which are applied to the liquid crystal at pixels in the multi-grayscale level drive method. The multi-grayscale level drive method disclosed in the aforementioned patent document 1 includes a plurality of drive processes to write a multi-grayscale image. It is assumed that an image IMG-f depicted on the upper left of FIG. 5 is a multi-grayscale image desired to be finally written. It is also assumed that the above image IMG-f includes four regions, which are constituted of grayscale levels L0 (transmission state, black), L1, L2 and L3 (reflection state, white).

First of all, in a step S1 of a binary drive phase, there are applied a low OFF voltage (for example, 20-26 V, preferably 24 V) to a pixel in the region of the grayscale level L0, and a high ON voltage (for example, 30-36 V, preferably 32 V) to a pixel in the region of the other grayscale levels L1-L3, for a relatively long time (4 ms, for example). More specifically, as depicted by S1 in FIG. 7, to the pixel of a selected scan electrode, either an alternating-current pixel pulse Vps-ON (±36 V) corresponding to the ON voltage or an alternating-current pixel pulse Vps-OFF (±24 V) corresponding to the OFF voltage is applied.

As a result, as depicted by S1 in FIG. 6, a pixel to which the ON voltage is applied becomes a planar state PL (grayscale level L3), while a pixel to which the OFF voltage is applied becomes a focal conic state FC (grayscale level L0). By the above write drive, a monochrome image having the color of each panel is written in. As depicted in FIG. 6, by the elongation of the drive time to 4 ms or so, the ON voltage to drive to produce the planar state is on the order of 30-36 V in the case of a standard liquid crystal panel, while the OFF voltage to drive to produce the focal conic state is on the order of 20-26 V. Therefore, in relation to the above-mentioned set values 32 V and 24 V, an allowed variation range of a power voltage to drive as depicted in the step S1 is ±2 V (32±2 V, 24±2 V) or so, which is relatively wide.

Next, a step S2 of a multilevel drive phase is configured of sub-steps S2-1 and S2-2. In the sub-step S2-1, among the region having been made to the grayscale level L3 (planar state PL) by the step S1, a relatively large ON voltage (for example, 24 V) is applied to the region having the grayscale levels L1, L2 of the image IMG-f, while a low OFF voltage (for example, less than 12 V) is applied to the region having the grayscale level L3 of the image IMG-f, respectively for a short time (2 ms, for example). Specifically, as depicted by S2-1 in FIG. 7, to a pixel of a scan electrode on which scanning is made, the alternating-current pixel pulse Vps-ON (±24 V) corresponding to the ON voltage or the alternating-current pixel pulse Vps-OFF (±12 V) corresponding to the OFF voltage is applied. By this, among the region in the reflection state having the grayscale level L3, a region to which the ON voltage is applied comes to be mixed with the focal conic state, and thereby the reflectivity is reduced and the value of the grayscale level is reduced.

As depicted by S2 in FIG. 6, by setting the application time as small as 2 ms, the incline of a gray region A in a voltage-reflectivity characteristic becomes large. Then, in regard to the pixels to which the ON voltage is applied, a pixel having been in the grayscale level L3 is shifted to the grayscale level L2, while a pixel having been in the grayscale level L0 remains unchanged in the grayscale level L0. Moreover, because the incline of the gray region A is large, it becomes possible to control the grayscale with high accuracy, corresponding to the ON voltage.

Finally, in the sub-step S2-2, among the region having been made to the grayscale level L2 in the sub-step S2-1, a relatively high ON voltage (for example, 24 V) is applied to a region having the grayscale level L1 in the image IMG-f, and a low OFF voltage (for example, less than 12 V) is applied to a region having the grayscale levels L2, L3, respectively for a shorter time (for example, 1 ms). Specifically, as depicted by S2-2 in FIG. 7, to a pixel of the scan electrode being scanned, either the alternating-current pixel pulse Vps-ON (±24 V) corresponding to the ON voltage or the alternating-current pixel pulse Vps-OFF (±12 V) corresponding to the OFF current is applied. Each pulse application time of the above alternating-current pixel pulses is as short as 1 ms.

As a result of the above write drive by the sub-step S2-2, among the pixels to which the ON voltage is applied, at a pixel having been in the grayscale level L2 increases to have the focal conic state is increased, so that the pixel is shifted into the grayscale level L1, while a pixel having been in the grayscale level L0 remains unchanged in the grayscale level L0. As a result, the write drive of the image IMG-f of a final target is completed.

As such, after the liquid crystal is driven to the planar state PL and the focal conic state FC in the step S1, by driving the region in the planar state gradually to the focal conic state in the step S2, it is possible to obtain high uniformity (low granularity), a large number of grayscale levels, and high black concentration (contrast).

As depicted by S2 in FIG. 6, by the application of a voltage within the region A, having an inclined characteristic curve, the liquid crystal material is made to have a desired reflectivity. The voltage range of the above region A is 15-30 V in the case of a standard panel. To write sixteen grayscale levels by means of a single pulse drive, a voltage width corresponding to one grayscale level is approximately 1 V (=(30−15)/(16−1)). Therefore, when it is assumed that an allowed variation range of power voltages is set to be a half of the above voltage width 1 V, the allowed variation range to execute the drive of the step S2 becomes ±0.25 V. Accordingly, there is required a high voltage accuracy of ⅛ as high as compared to the case of the step S1.

As depicted in FIG. 4, in the case of the write drive, the scan electrode drive circuit 31 successively selects a scan electrode by applying a selected scan pulse or a non-selected scan pulse to each scan electrode, and during a scan period being selected, the data electrode drive circuit 30 applies a data pulse corresponding to a write data to each data electrode. Then, to the liquid crystal of a pixel on which the data electrode intersects with the scan electrode, a differential voltage between the data pulse voltage and the scan pulse voltage is applied.

Figure 8:
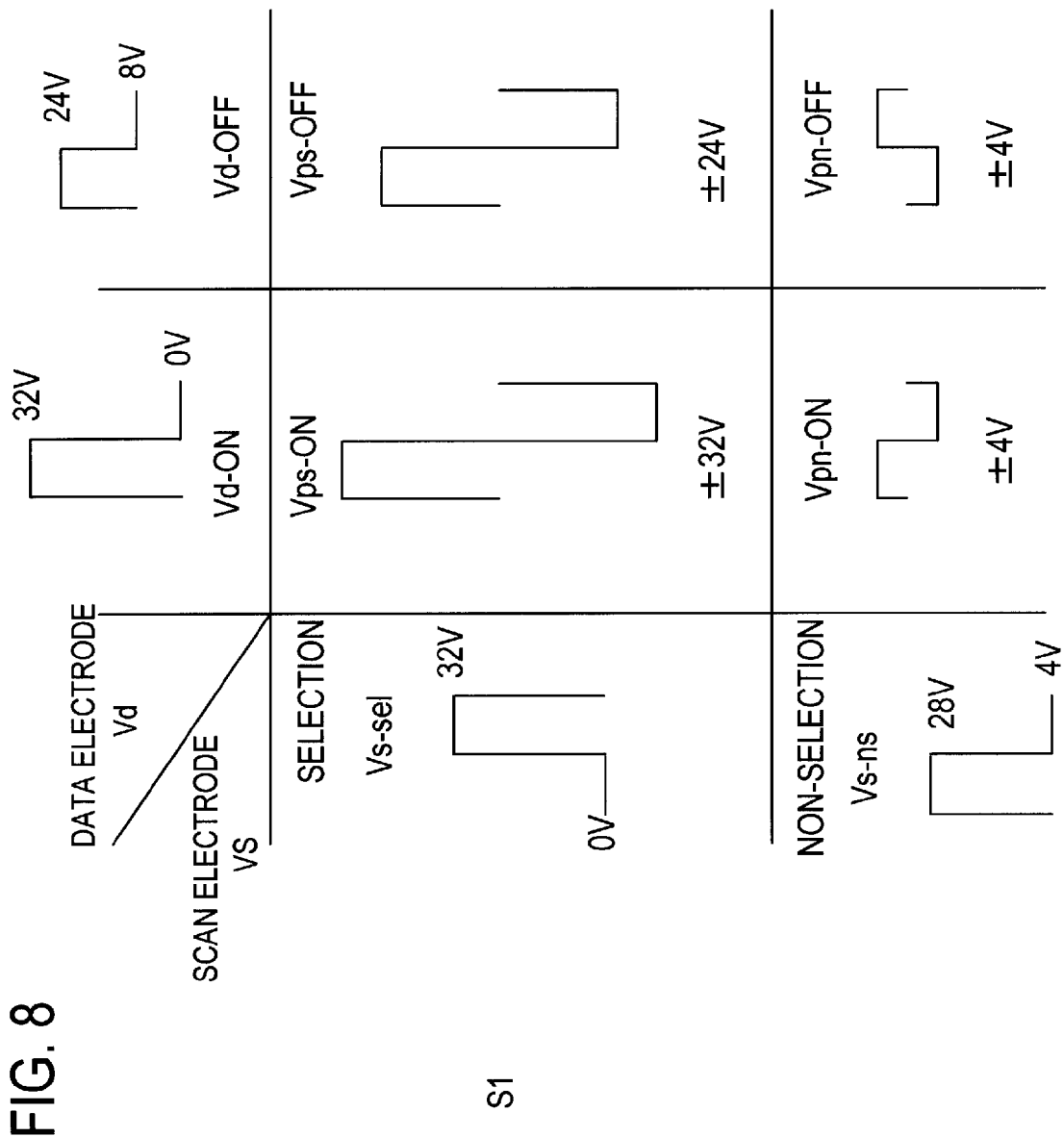
FIG. 8 is a diagram illustrating one example of alternating-current pulses to be applied in the step S1 of multi-grayscale level drive.

FIG. 8 is a diagram illustrating one example of alternating-current pulses to be applied in the step S1 of multi-grayscale level drive. To enable the application of each alternating-current pixel pulse depicted in FIG. 7, in the step S1, a selected scan pulse Vs-sel (0 V in the first half, and 32 V in the second half) and a non-selected scan pulse Vs-ns (28 V in the first half, and 4 V in the second half) are applied to the scan electrodes by means of the scan electrode drive circuit 31. Similarly, an ON data pulse Vd-ON (32 V in the first half, and 0 V in the second half) and an OFF data pulse Vd-OFF (24 V in the first half, and 8 V in the second half) are applied to the data electrodes by means of the data electrode drive circuit 30. Specifically, the selected scan pulse Vs-sel has the inverse polarity relative to the data pulses Vd-ON and Vd-OFF, while the non-selected scan pulse Vs-ns has the same polarity as the data pulses. Accordingly, relatively high alternating-current pulses Vps-ON, Vps-OFF are applied to each pixel of the selected scan pulse, while relatively low alternating-current pulses Vpn-ON, Vpn-OFF are applied to each pixel of the non-selected scan pulse. Further, the voltage of the non-selected scan pulse Vs-ns is set to an intermediate level between the ON and the OFF data pulses Vd-ON, Vd-OFF. By that, alternating-current pixel pulses to be applied to each pixel, namely alternating-current pixel pulses Vps-ON (±32 V), Vps-OFF (±24 V) for the pixel of the selected scan electrode and alternating-current pixel pulses Vpn-ON (±4 V), Vpn-OFF (±4 V) for the pixel of the non-selected scan electrode, are generated.

Figure 9:
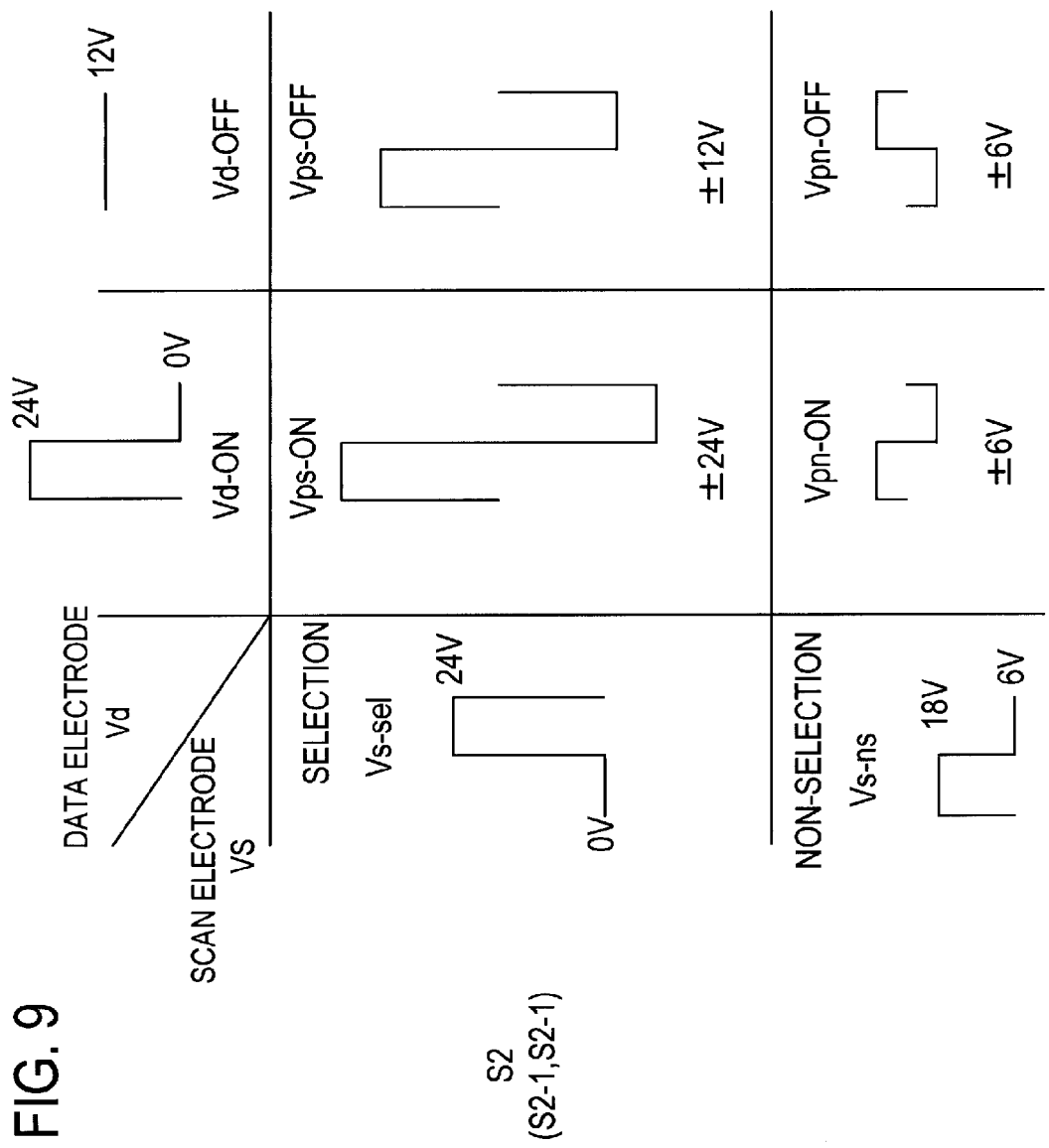
FIG. 9 is a diagram illustrating one example of alternating-current pulses in the step S2 of multi-grayscale level drive.

FIG. 9 is a diagram illustrating one example of alternating-current pulses in the step S2 of multi-grayscale level drive. In the step S2, each pulse voltage is set lower than the voltage in the step S1. The scan electrode drive circuit 31 applies a selected scan pulse Vs-sel (0 V in the first half, and 24 V in the second half) or a non-selected scan pulse Vs-ns (18 V in the first half, and 6 V in the second half) to each scan electrode. Similarly, the data electrode drive circuit 30 applies an ON data pulse Vd-ON (24 V in the first half, and 0 V in the second half) or an OFF data pulse Vd-OFF (12 V in the first half, and 12 V in the second half) to each data electrode. By that, alternating-current pixel pulses Vps-ON (±24 V), Vps-OFF (±12 V) for the pixel of the selected scan electrode and alternating-current pixel pulses Vpn-ON (±6 V), Vpn-OFF (±6 V) for the pixel of the non-selected scan electrode, which are alternating-current pixel pulses to be applied to each pixel, are generated.

Additionally, according to the setting of a pulse control signal FR described later, the scan pulses and the data pulses depicted in FIG. 8 and FIG. 9 can be pulses having a voltage combination in the first half and the second half as depicted in the figures, or pulses having inverse voltages combination depicted in the figures.

Figure 10:
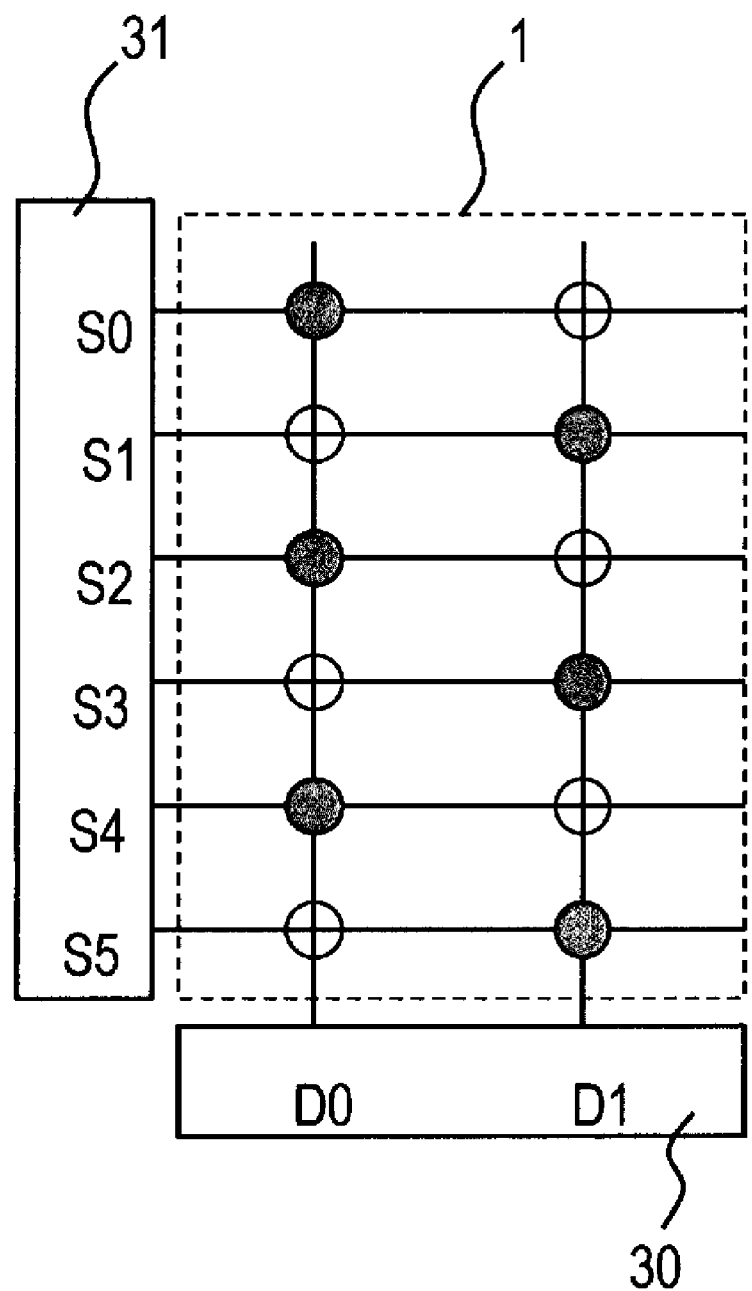
FIG. 10 is a diagram illustrating exemplary scan/data electrode drive circuits and scan/data electrodes.

FIG. 10 is a diagram illustrating exemplary scan/data electrode drive circuits and scan/data electrodes. As one example, there is given explanation on drive pulses when writing a monochrome image (black and white), having a houndstooth pattern depicted in the figure, into each pixel of the display panel 1.

Figure 11:
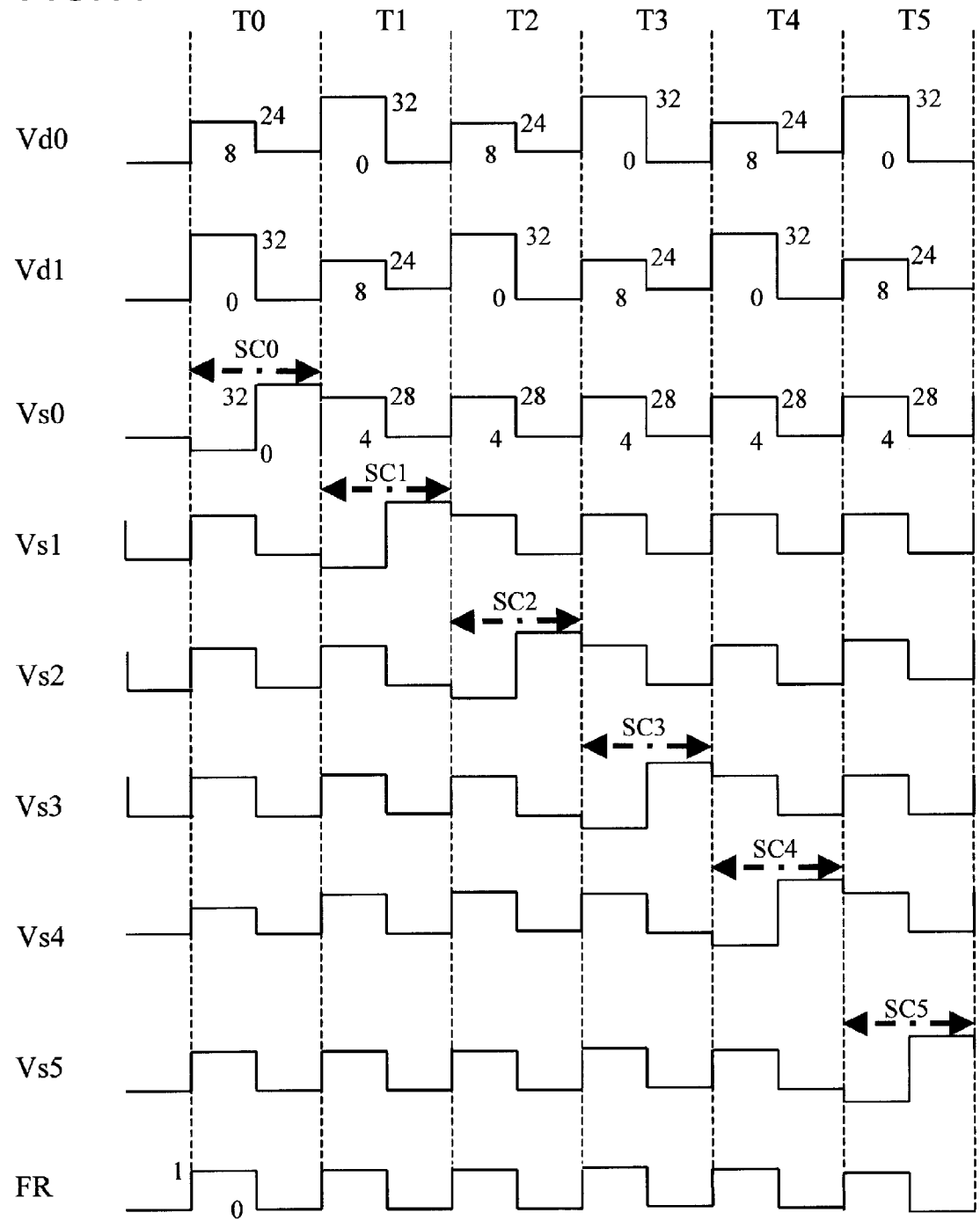
FIG. 11 is a diagram illustrating exemplary drive pulses in case of writing a monochrome image depicted in FIG. 10.

FIG. 11 is a diagram illustrating exemplary drive pulses in case of writing a monochrome image depicted in FIG. 10. Scan pulses Vs0-Vs5 are applied to scan electrodes S0-S5, and data pulses Vd0, Vd1 are applied to data electrodes D0, D1. In each scan period T0-T5, a selected scan pulse (0, 32 V) is successively applied to each selected scan electrode S0-S5, and further, to each of the other non-selected scan electrodes, a non-selected scan pulse (28, 4 V) is applied. Further, in regard to the data pulses Vd0, Vd1, an ON data pulse (32, 0 V) and an OFF data pulse (24, 8 V) are applied, corresponding to a data to be written into the pixels of the selected scan electrode. As depicted in FIG. 11, in normal operation, the selected scan pulse (0, 32 V) is applied only to one scan electrode in each selection period SC0-SC5. However, in some cases of special write operation, the selected scan pulse (0, 32 V) may be applied to a plurality of scan electrodes.

Figure 12:
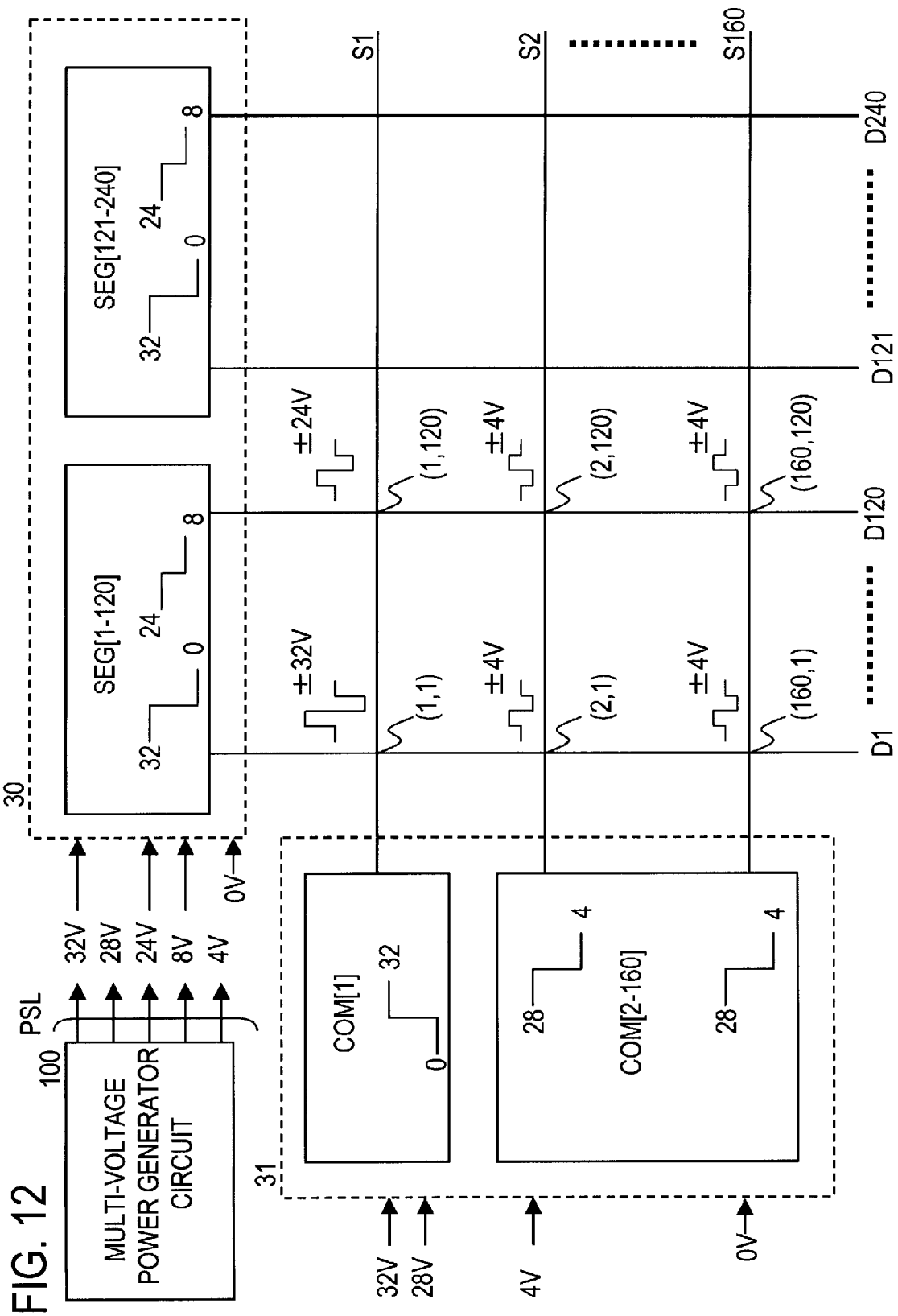
FIG. 12 is a diagram illustrating the relationship between a multi-voltage power generator circuit and an electrode drive circuit according to the present embodiment.

FIG. 12 is a diagram illustrating the relationship between a multi-voltage power generator circuit and an electrode drive circuit according to the present embodiment. In the example depicted in FIG. 12, there are provided 160 scan electrodes S1-S160 and 240 data electrodes S1-S240 in a panel. In the scan electrode drive circuit 31, there are depicted a circuit COM[1] for driving the scan electrode S1 and circuits COM[2-160] for driving the remaining scan electrodes S2-S160. Also, in the data electrode drive circuit 30, there are depicted circuits SEG[1-120] and SEG[121-240] for driving the data electrodes D1-D120 and D121-D240, respectively.

As having been explained referring to FIGS. 8 and 9, in the drive step S1, the scan electrode drive circuit 31 generates scan pulses Vs-sel, Vs-ns by the combination of four voltages, including voltages of 32 V, 28 V, 4 V and 0 V, while the data electrode drive circuit 30 generates data pulses Vd-ON, Vd-OFF by the combination of four voltages, including voltages of 32 V, 24 V, 8 V and 0 V.

Further, a multi-voltage power generator circuit 100 generates multi-voltage power sources of 32, 28, 24, 8 and 4 V, and connects power supply lines PSL of necessary power voltages to the scan electrode drive circuit 31 and the data electrode drive circuit 30.

In FIG. 12, the selected scan pulse Vs-sel (0, 32 V) is applied to the scan electrode S1, and the non-selected scan pulses Vs-ns (28, 4 V) are applied to the other scan electrodes S2-S160. Further, either the ON data pulse Vd-ON (32 V in the first half, and 0 V in the second half) or the OFF data pulse Vd-OFF (24 V in the first half, and 8 V in the second half) is applied to each data electrode D1-D240.

The scan electrode drive circuit 31 and the data electrode drive circuit 30 apply pulses to each scan/data electrode by the connection of four power supply lines and ground lines (0 V) to the electrodes through switches provided in the drive circuits. Further, a scan electrode and a data electrode intersecting thereto configure a pixel. Accordingly, each power supply line connected to the scan electrode becomes either a source load which injects current or a sink lord which absorbs current, according to a relative voltage difference between the power supply line concerned and the power supply line connected to the data electrode. More specifically, if the voltage of the data electrode is lower, the power supply line connected to the scan electrode becomes the source load, while if the above voltage is higher, the above power line becomes the sink load. Oppositely, the power supply line connected to the data electrode becomes the source load or the sink load according to a relative voltage difference between the power supply line concerned and the power supply line connected to the scan electrode.

Description will be made by use of a typical example. It is assumed that a selected scan pulse (0, 32 V) is applied to the scan electrode S1, and non-selected pulses (28, 4 V) are applied to the other scan electrodes S2-S160, and that ON data pulses (32, 0 V) are applied to the entire data electrodes D1-D240. In the first half of the above pulses, a 28 V power supply line is connected only to the scan electrodes S2-S160 via the drive circuits COM[2-160], and a 32 V power supply line is connected to the entire 240 data electrodes D1-D240 which are disposed opposite to the above 159 scan electrodes. Accordingly, the initial voltage of the load of the 28 V power supply line becomes 32 V, and thus, the 28 V power supply line becomes the sink load which absorbs current from the opposite 32 V power supply line. On the other hand, the 32 V power supply line is connected to the 240 data electrodes S2-S160 via the drive circuits SEG[1-120], SEG[121-240], a ground power source (0 V) is connected to one scan electrode S1 disposed opposite thereto, and also, the 28 V power supply line is connected to the 159 scan electrodes S2-S160. Accordingly, the initial voltage of the load of the 32 V power supply line becomes (0+28*159)/160=27.825 V, and thus, the 32 V power supply line becomes the source load which absorbs current.

To summarize, the 32 V power supply line having the highest voltage is the source load at all times. In case of normal operation in which only one scan electrode is selected, the power supply lines of 24 V and 8 V only become the sink load and the source load, respectively. On the other hand, the power supply lines of 28 V and 4 V become the sink load or the source load, depending on the data ON or OFF. Further, in case that a plurality of scan electrodes are selected, the power supply lines of 24 V and 8 V also become the sink load or the source load.

Figure 13:
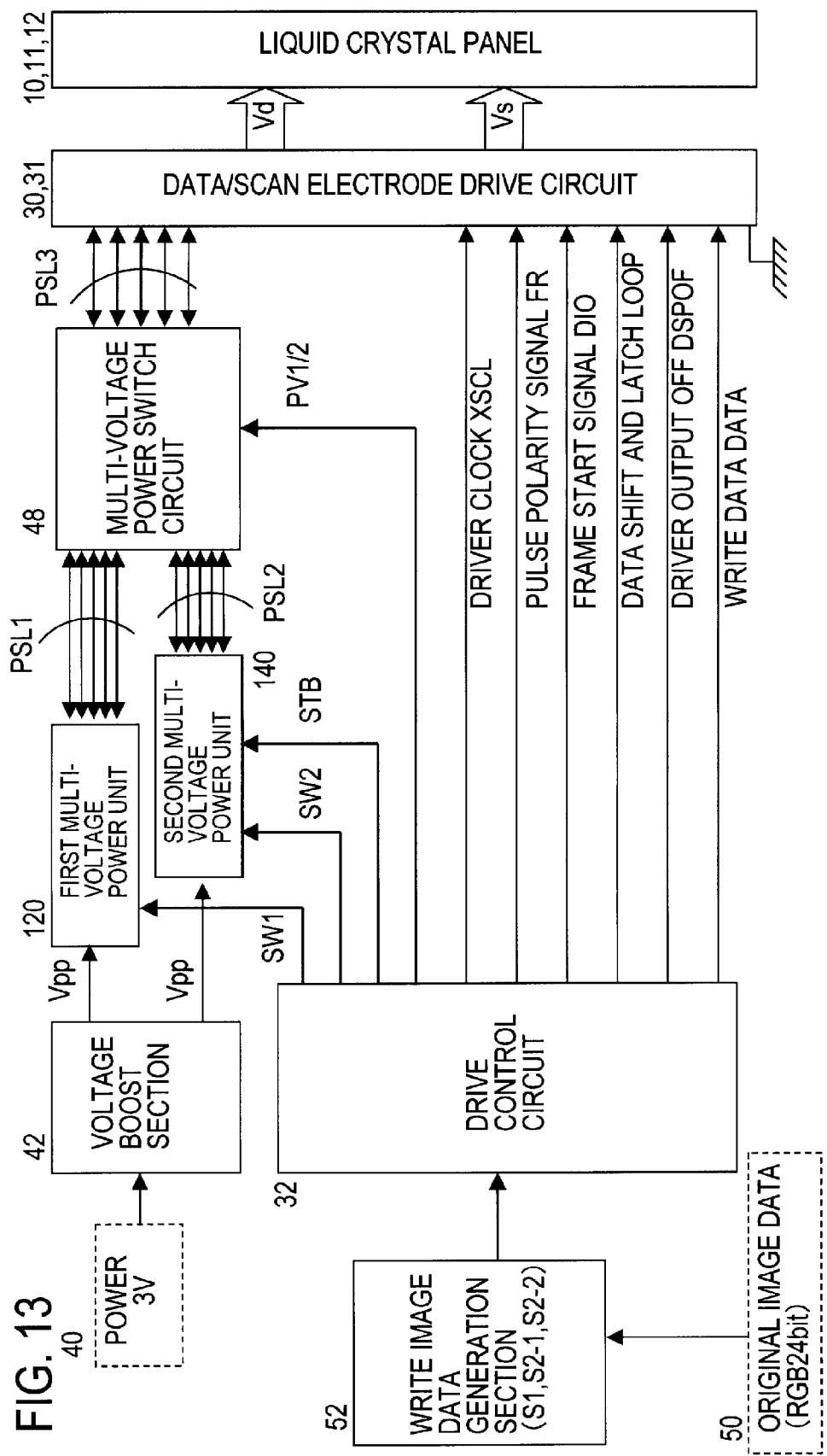
FIG. 13 is a configuration diagram of a display device according to the present embodiment.

FIG. 13 is a configuration diagram of a display device according to the present embodiment. By means of the scan electrode drive circuit 31 and the data electrode drive circuit 30, the scan electrodes and the data electrodes of the liquid crystal panels 10, 11, 12 are scan driven and data driven. An original image data 50 to be displayed is a data constituted of 32 bits in total, having R, G and B of 8 bits each. A write image data generation section 52 converts the original image data 50 into a write data to be used in the write drive processes S1, S2-1, S2-2, so as to output the write data to the drive control circuit 32.

The drive control circuit 32 supplies, to the electrode drive circuits 30, 31, a driver clock XSCL indicating drive timing, a pulse polarity control signal FR for controlling the polarity of a drive pulse, a frame start signal DIO indicating the start timing of each frame in the write processes, a data shift latch signal LP indicating the latch timing of a write data, a driver output OFF signal DSPOF, a write data DATA corresponding to each write drive process S1, S2-1, S2-2, and so on, so as to control the generation of the aforementioned scan pulses and data pulses.

A voltage boost section 42 boosts external power 40 of 3 V, for example, to generate a boost voltage Vpp of 32 V, for example, and supplies the boost voltage Vpp to first and second multi-voltage power units 120, 140. The first multi-voltage power unit is a circuit having relatively small power consumption, though the stability or the accuracy of the generated power voltage is low, and generates multi-voltage power sources of 32, 28, 24, 8 and 4 V. As compared to the first multi-voltage power unit, the second multi-voltage power unit is a circuit having large power consumption, though the stability or the accuracy of the generated power voltage is high, and generates multi-voltage power sources of 24, 18, 12, 12 and 6 V.

Figure 2A:
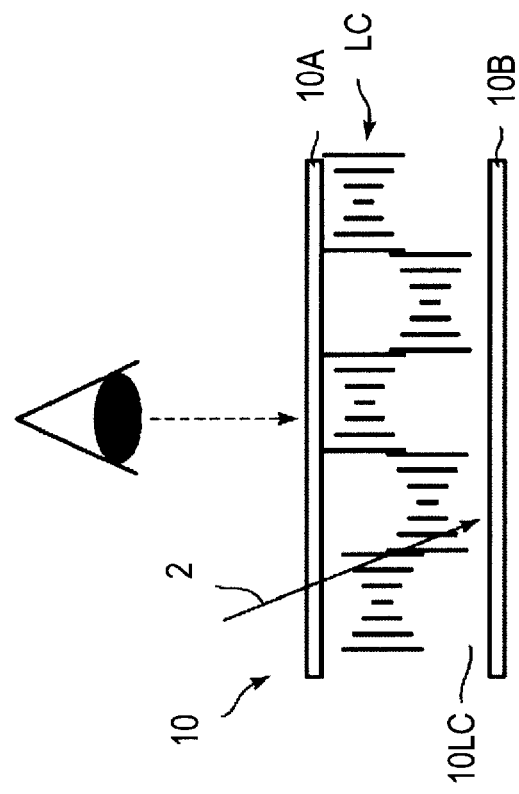
FIGS. 2A and 2B are diagrams illustrating the display principle of the liquid crystal display device by use of the cholesteric liquid crystal.
Figure 2B:
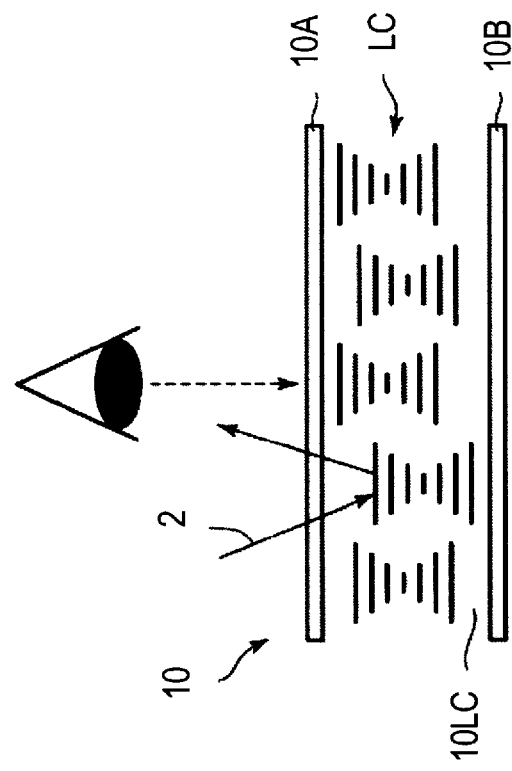
Figure 3:
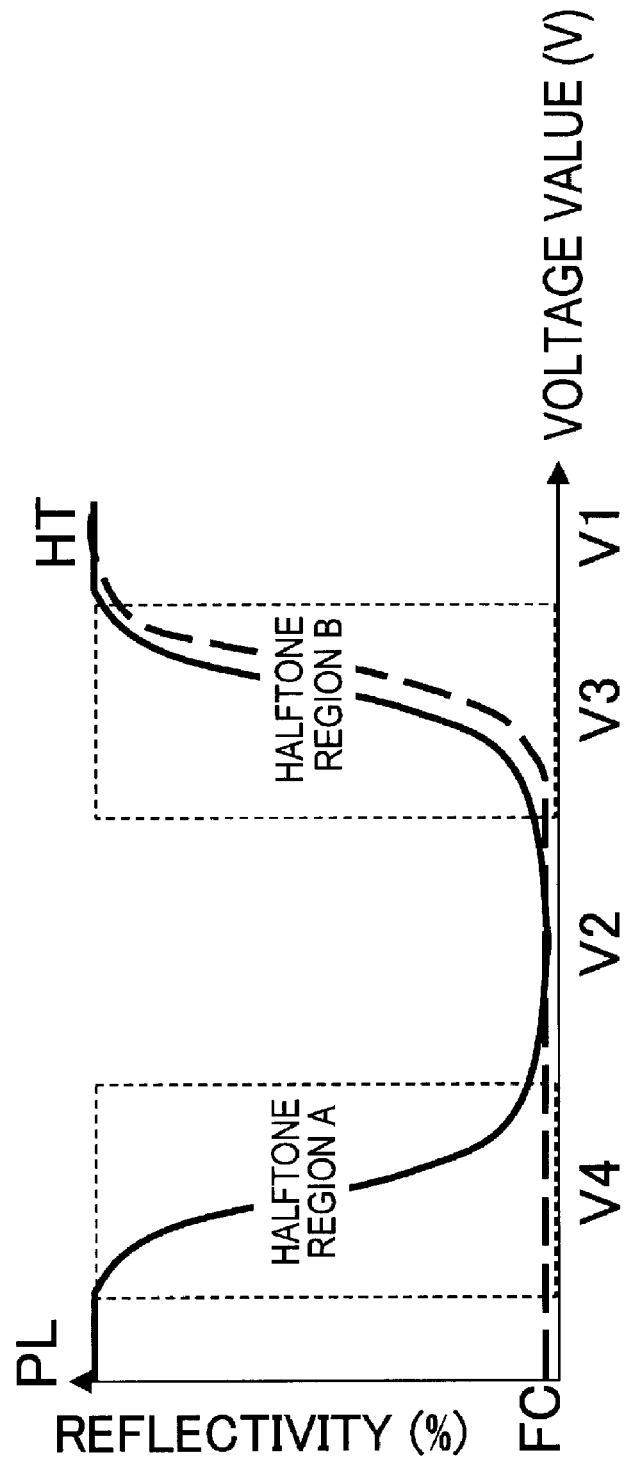
FIG. 3 is a diagram illustrating a reflectivity characteristic versus a drive voltage in a cholesteric liquid crystal.

Then, in the aforementioned drive step S1 of the binary drive phase, the multi-voltage power sources (32, 28, 24, 8 and 4 V) generated by the first multi-voltage power unit 120 are supplied to the data electrode drive circuit 30 and the scan electrode drive circuit 31, as illustrated in FIG. 12. Further, in the drive step S2 (S2-1, S2-2) of the multilevel drive phase, the multi-voltage power sources (24, 18, 12, 12 and 6 V) generated by the second multi-voltage power unit 140 are supplied to the data electrode drive circuit 30 and the scan electrode drive circuit 31. As depicted in FIG. 2, the power voltages 24, 18 and 6 V are supplied to the scan electrode drive circuit 31, while the power voltages 24 and 12 V are supplied to the data electrode drive circuit 30.

Further, the second multi-voltage power unit 140 having large power consumption is controlled to be an active state only during the period of the drive step S2. On the other hand, in other than the drive step S2, namely, during the drive step S1 and during an idle period in which no write drive is made, the second multi-voltage power unit 140 is controlled to be an inactive state. For the above purpose, the drive control circuit 32 controls the active state of the second power voltage generator unit by means of a switch signal SW2. Thus, the second power voltage generator unit having large power consumption in the active state is set to the active state during a limited period only, so that it is possible to reduce power consumption.

To enable the above-mentioned operation, there is provided a multi-voltage power switch circuit 48 which selects either multi-voltage power supply lines PSL1 corresponding to the multi-voltage power sources (32, 28, 24, 8 and 4 V) from the first power voltage generator unit 120 or multi-voltage power supply lines PSL2 corresponding to the multi-voltage power sources (24, 18, 12, 12 and 6 V) from the second power voltage generator unit 140. Then, using a power selection signal PV1/2, the drive control circuit 32 controls the multi-voltage power switch circuit 48, and the multi-voltage power switch circuit 48 selects the first multi-voltage power supply lines PSL1 in the case of the drive phase S1 and the second multi-voltage power supply lines PSL2 in the case of the drive phase S2, respectively, so as to connect the selected multi-voltage power supply lines PSL1 or PSL2 to multi-voltage power supply lines PSL3, and supplies respective power voltages to the data electrode drive circuit 30 and the scan electrode drive circuit 31.

Further, using switch signals SW1, SW2, the drive control circuit 32 connects the boost voltage power Vpp to either the first or the second multi-voltage power unit 120, 140, so as to control each multi-voltage power unit to have the active state.

Figure 14:
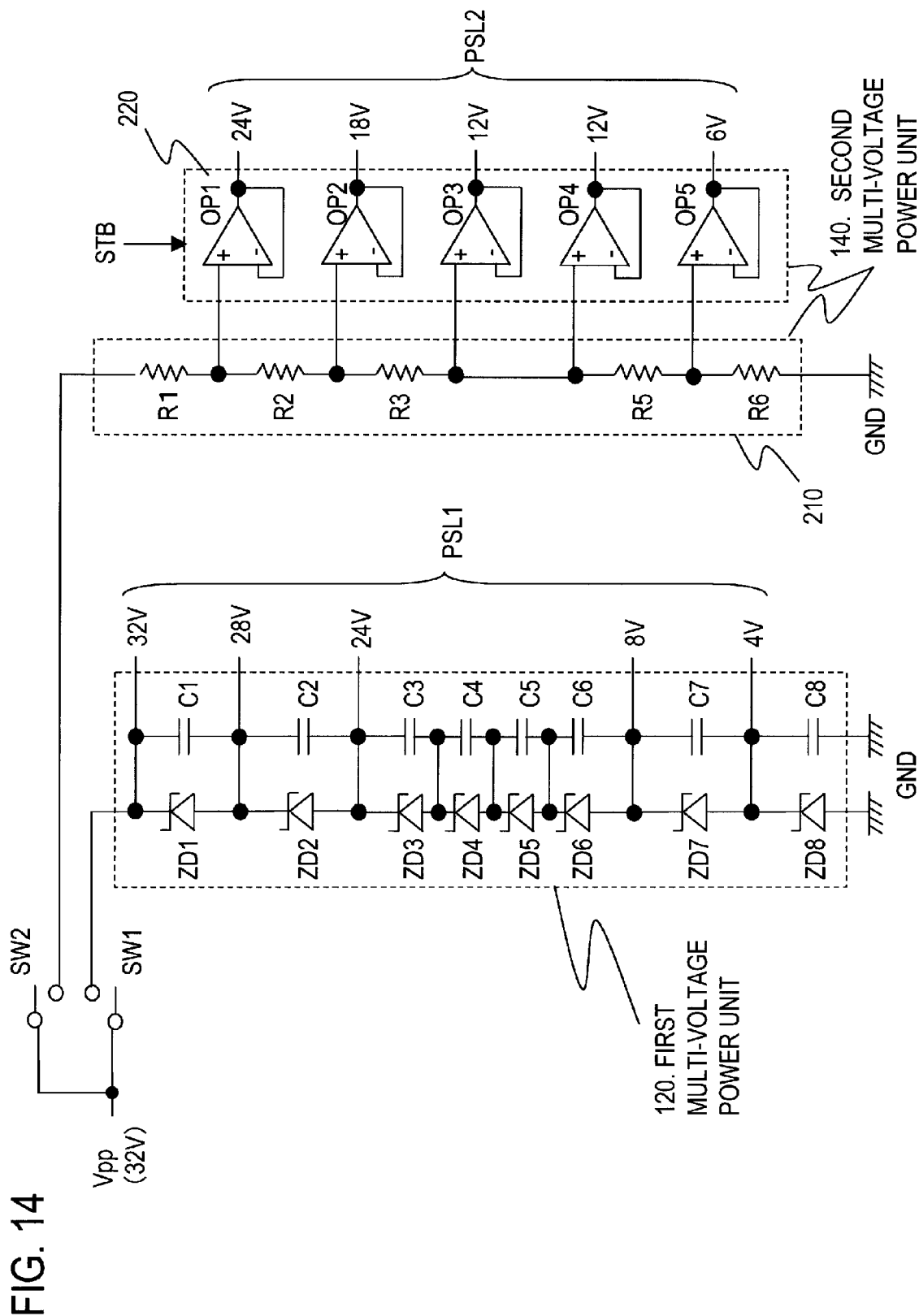
FIG. 14 is a diagram illustrating exemplary circuits of the first and the second multi-voltage power units according to the present embodiment.

FIG. 14 is a diagram illustrating exemplary circuits of the first and the second multi-voltage power units according to the present embodiment. The first multi-voltage power unit 120 is a Zener-diode-array multi-voltage power unit, in which eight Zener diodes are connected in series between the boost voltage power Vpp and the ground GND, and also, capacitors C1-C8 are respectively connected in parallel between the anodes and the cathodes of the Zener diodes. The Zener voltage of each Zener diode is 4.2 V, for example, and the capacitors have identical electrostatic capacitance.

In the above Zener-diode-array multi-voltage power circuit 120, each capacitor has a terminal voltage 0 V in the initial state, and each Zener diode has a non-conductive state. Then, when the boost voltage Vpp (32 V) is applied in response to the switch signal SW1, charges are injected via each Zener diode ZD1-8, and the entire capacitors are charged to have a uniform voltage, so that the entire voltages between the capacitor terminals become 4.0 V. As a result, the five power supply lines PSL1 on the output become 32 V, 28 V, 24 V, 8 V and 4 V, respectively. Also, because it is necessary to charge the entire capacitors from the initial state to the above steady state, a relatively long time is required.

As described in FIG. 12, when the scan pulses and the data pulses are applied to the electrodes in the rewrite drive process, each multi-voltage power supply line PSL1, i.e. the output of the multi-voltage power units, becomes sink load or source load, and either one of the voltages of the five power supply lines PSL1 decreases or increased. When the voltage of one of the power supply lines decreases, the total of the interterminal voltages between each capacitor becomes lower than 32 V, thereby a charge current flows in, and the voltage of the power supply line having the reduced voltage increases. At the end of the charge and discharge, all interterminal voltages of each capacitor and each Zener diode returns to 4.0 V. Oppositely, when the voltage of one of the power supply lines increases and the interterminal voltage of each capacitor exceeds 4.2 V, each Zener diode becomes to be a conductive state. Thus, the interterminal voltage of each capacitor is maintained at 4.2 V, and the voltage of each power supply line decreases. Further, at the end of the charge and discharge, all interterminal voltages of each capacitor and each Zener diode returns to 4.0 V. Thus, the Zener-diode-array multi-voltage power circuit 120 has sufficient sink capability or source capability for the sink load or the source load. Also, in the steady state such that no load is connected to the multi-voltage power supply lines PSL1, the Zener diodes are the non-conductive state, and the power consumption becomes substantially zero. However, to the voltage variation of the multi-voltage power supply lines, the interterminal voltage of each Zener diode is varied relatively largely, namely 3.6 V to 4.2 V relative to the center value of 4.0 V.

As described above, the first multi-voltage power unit formed of the Zener diode array has substantially zero power consumption in the steady state, and however, the variation range of the power voltage is wide and the voltage accuracy is low.

On the other hand, the second multi-voltage power circuit 140 includes a resistance voltage division circuit 210 constituted of resistors R1-R6, connected in series between the boost voltage Vpp and the ground GND, and a voltage follower group 220 constituted of operational amplifiers, each having a voltage-divided node (connection point of the resistors) of the resistance voltage-division circuit as an input.

Five multi-voltage power sources 24, 18, 12, 12, 6 V are respectively generated in the resistance voltage-division nodes of the resistance voltage division circuit 210. Then, according to the above voltage-divided voltage, voltage followers constituted of the operational amplifiers OP1-OP5 drive the second multi-voltage power supply lines PSL2.

Each operational amplifier OP1-OP5 in the voltage follower group 220 connects each voltage-divided node of the resistance voltage division circuit 210 to an input terminal of positive polarity, and also connects the output node to an input terminal of negative polarity. Therefore, the output voltage of each operational amplifier OP1-OP5 is maintained to the voltage of the voltage-divided node of the resistance voltage division circuit 210. The operation of the operational amplifier having sufficient source and sink capability and slew rate maintains, the voltages of the five multi-voltage power supply lines PSL2 to be substantially constant, with a negligibly small voltage variation in general, and exceedingly high voltage accuracy. Moreover, the rising operation when the boost voltage Vpp is connected by means of the switch signal SW2 is completed within a short time, because it is unnecessary to charge capacitors as in the case of the Zener diode array. However, the operational amplifiers OP1-OP5 consume large power in the steady state, because of a continuous flow of a large output current.

Figure 17:
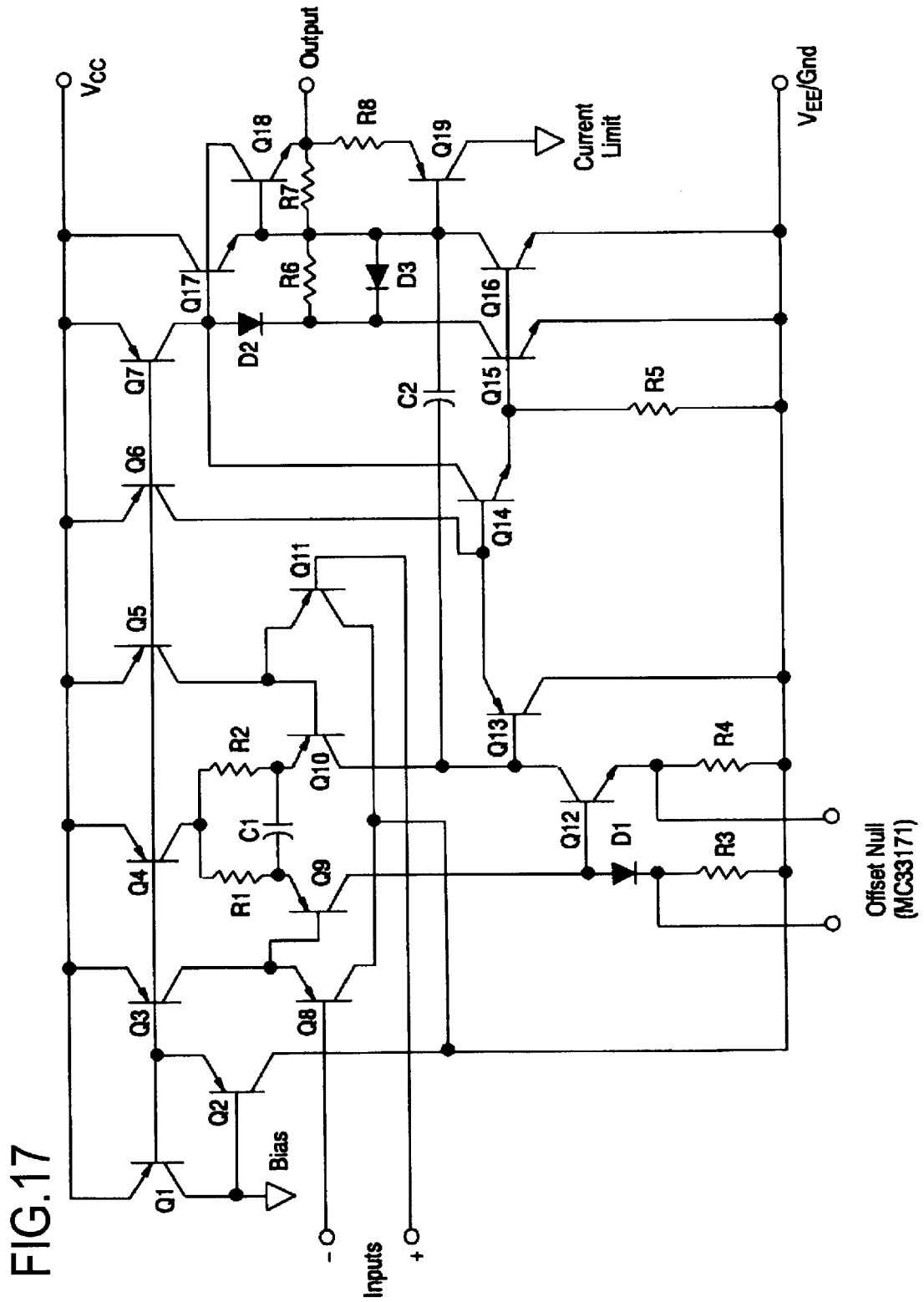
FIG. 17 is a diagram illustrating a typical example of an operational amplifier circuit.

FIG. 17 is a diagram illustrating a typical example of an operational amplifier circuit. In response to a differential input Inputs, a pair of transistors Q8, Q11 is differentially operated, and an output Output is driven by a voltage follower circuit constituted of transistors Q7, Q17, Q18, Q15, Q16 etc. Although a large current is consumed, the above voltage follower circuit abruptly responds to an output voltage variation, and accordingly the voltage variation is quite small.

Now, in the liquid crystal display device according to the present embodiment, in the drive step S1 of the binary drive phase, the multi-voltage power supply lines PSL1 of the first multi-voltage power unit 120 is connected to the drive circuits 30, 31. Also, in the drive step S2 of the multilevel drive phase, the multi-voltage power supply lines PSL2 of the second multi-voltage power unit 140 is connected to the drive circuits 30, 31. Further, the second multi-voltage power unit 140 is controlled to be an active state in the drive step S2 only, because of a large current consumption amount in the steady state although having a short-time rise characteristic. On the other hand, the first multi-voltage power unit 120 is controlled to be the active state in the drive step S1 only. The active state and the inactive state are controlled by switching on and off the switches SW1, SW2 that connect the boost voltage Vpp to the first and the second multi-voltage power units 120, 140.

Here, since the first multi-voltage power unit has a small current consumption amount in the steady state though having a relatively long rise characteristic, the active state may be maintained not only in the period of the drive step S1, but also in the period of the drive step S2 and in the idle state between the drive steps.

Figure 15:
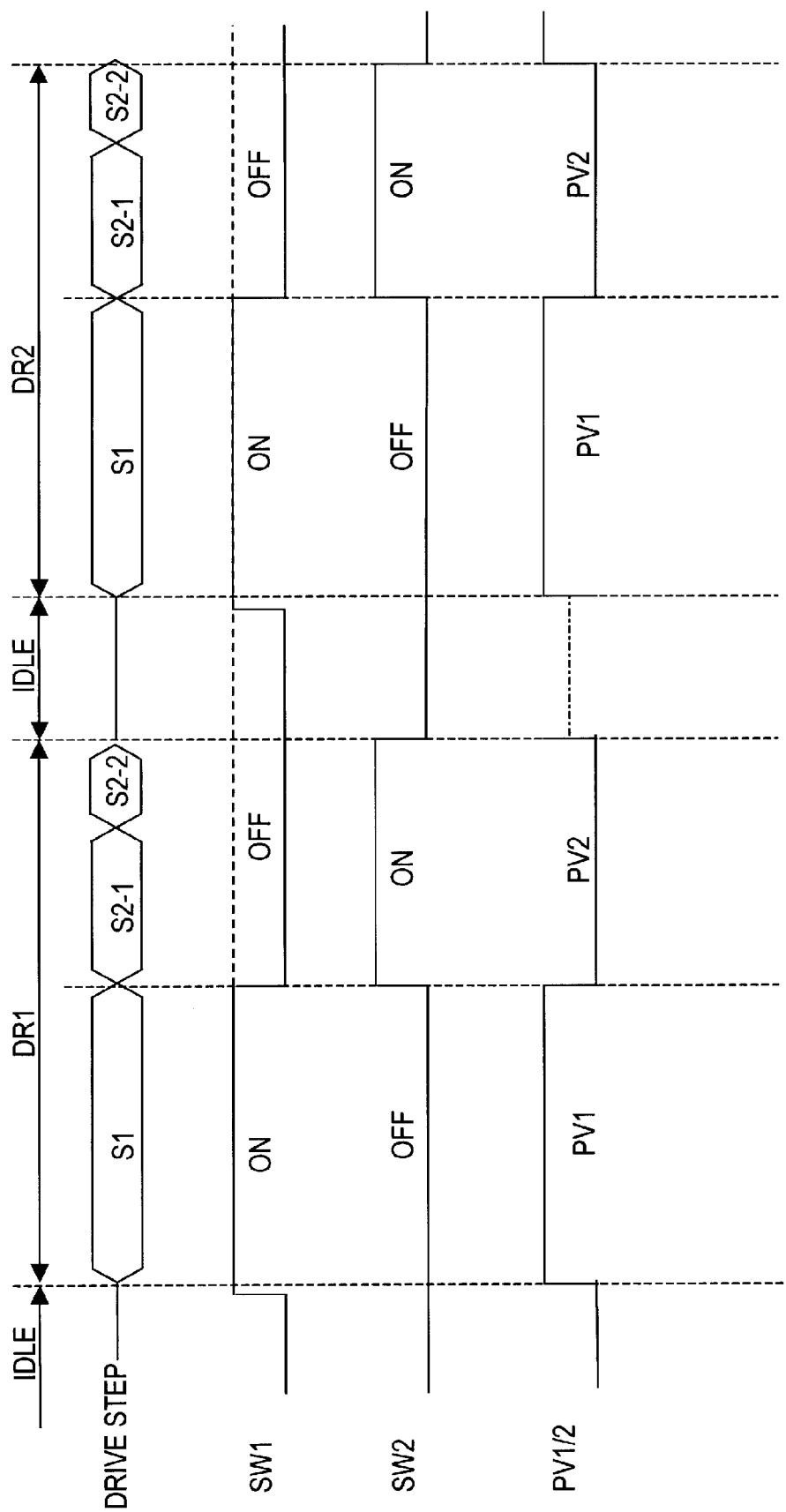
FIG. 15 is a diagram illustrating a first example of a drive control signal by the drive control circuit according to the present embodiment.

FIG. 15 is a diagram illustrating a first example of a drive control signal by the drive control circuit according to the present embodiment. The liquid crystal display device using the cholesteric liquid crystal is expected to be used as electronic paper. In the case of the electronic paper, a static image is displayed by rewriting a frame image with a low frequency, instead of displaying a moving image by rewriting a frame image in a short time. In FIG. 15, there are depicted an idle state IDLE in which the static image is displayed, and two times of image rewrite drives DR1, DR2. As described earlier, each image rewrite drives DR1, DR2 includes the binary drive phase S1 and the multilevel drive phases S2-1, S2-2.

The active state and the inactive state of the first and the second multi-voltage power units 120, 140 are controlled by the control signals SW1, SW2 of switches that respectively connect the boost voltage Vpp. Then, in the idle state IDLE, the drive control circuit 32 sets both the switch control signals SW1, SW2 to be OFF, so that both the first and the second multi-voltage power units 120, 140 are set to the inactive state. Further, in the image rewrite drive DR1, DR2, the switch control signal SW1 is set ON in the binary drive phase S1, so that the first multi-voltage power unit 120 is set to the active state, and also, a multi-voltage power switch signal PV1/2 is switched to PV1, so that the first multi-voltage power supply lines PSL1 are connected to the third multi-voltage power supply lines PSL3. By this, the first multi-voltage power supply lines PSL1 are connected to the data/scan electrode drive circuits 30, 31. Using the first multi-power voltages, the electrode drive circuits 30, 31 generate drive pulses, and apply the drive pulses to the data electrodes and the scan electrodes. At this time, the switch control signal SW2 remains OFF, so that the second multi-voltage power unit 140 remains in the inactive state.

Next, in the image rewrite drive DR1, DR2, the switch control signal SW2 is set ON in the multilevel drive phases S2-1, S2-2, so that the second multi-voltage power unit 120 is set to the active state, and also, a multi-voltage power switch signal PV1/2 is set to be PV2, so that the second multi-voltage power supply lines PSL2 are connected to the third multi-voltage power supply lines PSL3. By this, the second multi-voltage power supply lines PSL2 are connected to the data/scan electrode drive circuits 30, 31. Using the second multi-power voltages, the electrode drive circuits 30, 31 generate drive pulses, and apply the drive pulses to the data electrodes and the scan electrodes.

At this time, the switch control signal SW1 is switched OFF, so that the first multi-voltage power unit 120 is controlled to be in the inactive state.

As described above, in the image rewrite drive DR1, DR2, during the binary drive phases S1, the drive control circuit 32 sets the first multi-voltage power unit 120 to the active state and the second multi-voltage power unit 140 to the inactive state, so as to connect the first multi-voltage power supply lines PSL1 to the electrode drive circuits 30, 31. Further, during the multilevel drive phase S2-1, S2-2, the drive control circuit 32 sets the first multi-voltage power unit 120 to the inactive state and the second multi-voltage power unit 140 to the active state, so as to connect the second multi-voltage power supply lines PSL2 to the electrode drive circuits 30, 31. Thus, the first and the second multi-voltage power units 120, 140 become the active state only in the necessary period, and accordingly, it is possible to suppress power consumption in the overall display device.

As a variation example of the above drive control, the drive control circuit 32 sets the switch control signal SW1 continuously in the ON state, as depicted by the broken lines, so as to maintain the first multi-voltage power unit 120 continuously in the active state not only in the image rewrite drive DR1, DR2, but also in the idle state. The first multi-voltage power unit 120 consumes a small current even in the active state, and therefore, the increase of the consumption current is small even when being continuously maintained in the active state. In contrast, since a long time is required at the time of initiation, it becomes possible to eliminate a wasted initiation time by maintaining in the active state at all times.

Figure 16:
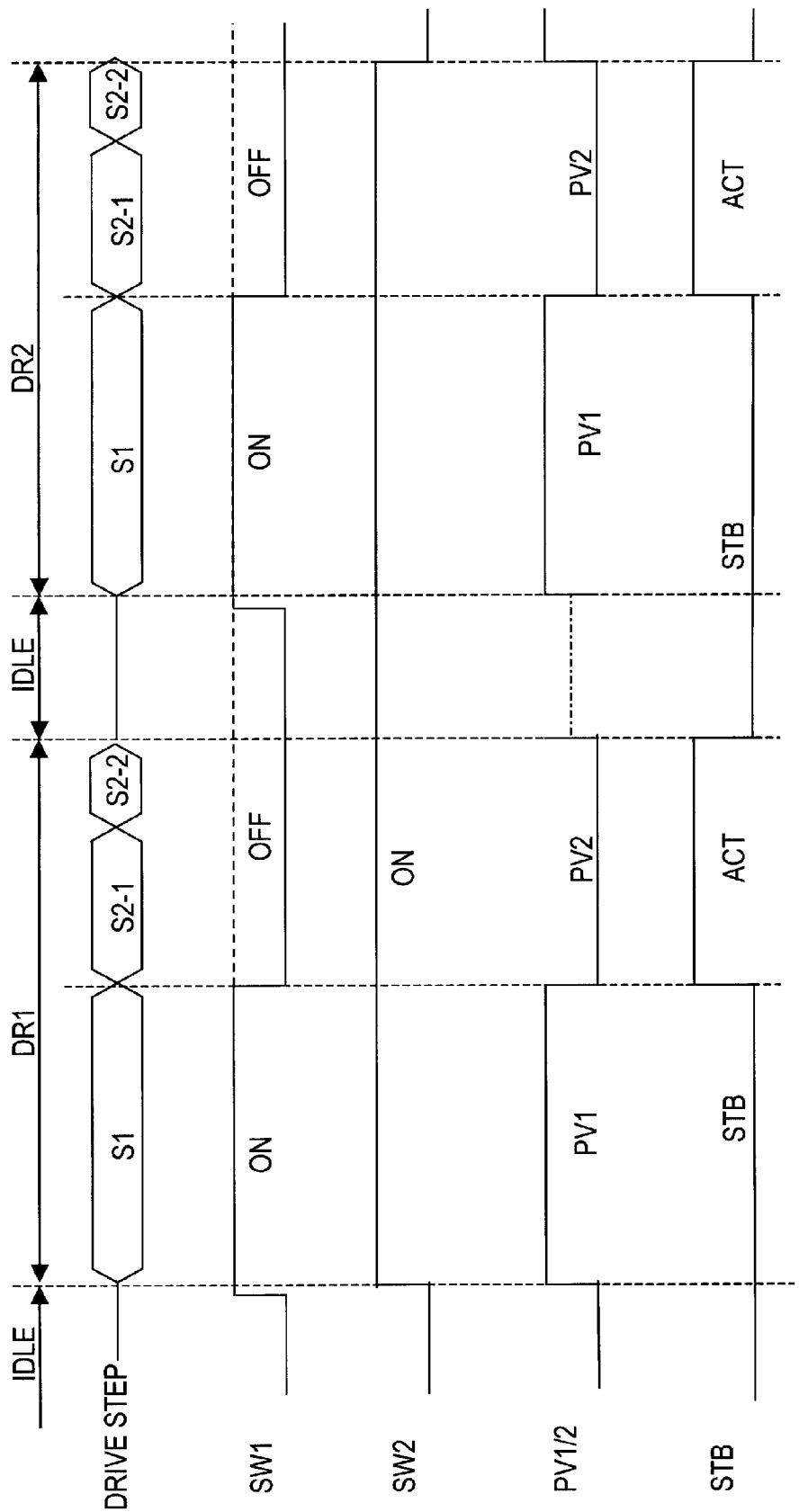
FIG. 16 is a diagram illustrating a second example of a drive control signal by means of the drive control circuit according to the present embodiment.

FIG. 16 is a diagram illustrating a second example of a drive control signal by means of the drive control circuit according to the present embodiment. The second multi-voltage power unit 140 includes operational amplifiers OP1-OP5.

The operational amplifier has a function of standing by in a standby state having a small consumption current. In that case, by a standby signal STB depicted in FIG. 13 and FIG. 16, the drive control circuit 32 controls the operational amplifier group in the second multi-voltage power unit 140 to be in the standby state (STB) in the period excluding the multi-grayscale level drive phases S2-1, S2-2, and controls the operational amplifier group to the active state (ACT) only during the period of multi-grayscale level drive phases S2-1, S2-2. In the above case, the switch control signal SW2 can be set ON at all times in the rewrite drives DR1, DR2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A liquid crystal display device, in which a multi-grayscale level state is produced in a liquid crystal layer by applying a different voltage thereto, comprising:
   a liquid crystal display panel having the liquid crystal layer between first and second electrodes;
   an electrode drive circuit, being supplied with multi-voltage power sources, and applying drive voltage pulses generated from the multi-voltage power sources to the first and the second electrodes; and
   a multi-voltage power generator circuit supplying the multi-voltage power sources to the electrode drive circuit,
   wherein the multi-voltage power generator circuit includes a first multi-voltage power unit generating first multi-voltage power sources with first stability and having a first consumption current, and a second multi-voltage power unit generating second multi-voltage power sources with second stability higher than the first stability, and having a second consumption current higher than the first consumption current, and
   the liquid crystal display device further comprising:
   a multi-voltage power switch circuit supplying the first or the second multi-voltage power sources from the first or the second multi-voltage power units to the electrode drive circuit; and
   a control circuit, in a first drive step, setting the first multi-voltage power unit to an active state and switching the multi-voltage power switch circuit to a supplying state of the first multi-voltage power sources, and, in a second drive step, setting the second multi-voltage power unit to the active state and switching the multi-voltage power switch circuit to a supplying state of the second multi-voltage power sources, wherein
   the first drive step includes a one-time binary drive phase for applying, to the first and the second electrodes, a first drive voltage pulse to set the liquid crystal layer to first and second grayscale levels,
   the second drive step includes a plurality of times of multilevel drive phases for applying, to the first and the second electrodes, a second drive voltage pulse to set the liquid crystal layer, having been set to the first grayscale level, to a plurality of third grayscale levels.

2. The liquid crystal display device according to claim 1, wherein the liquid crystal layer includes a cholesteric liquid crystal material,
   in the first drive step, the control circuit sets the first multi-voltage power unit to the active state, and sets the second multi-voltage power unit to an inactive state.

3. The liquid crystal display device according to claim 1, wherein, in the non-drive period other than the first and the second drive steps, the control circuit controls the second multi-voltage power unit to be in the inactive state.

4. The liquid crystal display device according to claim 1, wherein the first multi-voltage power unit includes a plurality of Zener diodes connected in series between a first voltage and a second voltage lower than the first voltage, and a plurality of capacitors connected in parallel to the Zener diodes respectively.

5. The liquid crystal display device according to claim 4, wherein the multi-voltage power unit includes a power switch inputting the first voltage, and
   the control circuit sets the corresponding multi-voltage power unit to the active state by switching on the power switch, and sets the corresponding multi-voltage power unit to the inactive state by switching off the power switch.

6. The liquid crystal display device according to claim 1, wherein the second multi-voltage power unit includes a plurality of resistors connected in series between a first voltage and a second voltage lower than the first voltage, and a plurality of voltage followers including operational amplifiers each having input of positive polarity connected to connection nodes of the plurality of resistors, and having input of negative polarity connected to output terminal outputting the second multi-voltage power source.

7. The liquid crystal display device according to claim 6, wherein the multi-voltage power unit includes a power switch inputting the first voltage, and
   the control circuit sets the corresponding multi-voltage power unit to the active state by switching on the power switch, and sets the corresponding multi-voltage power unit to the inactive state by switching off the power switch.

* * * * *